(12) United States Patent
Kleinlogel et al.

(10) Patent No.: US 12,509,705 B2
(45) Date of Patent: Dec. 30, 2025

(54) AAV VECTOR VARIANTS FOR OCULAR GENE DELIVERY

(71) Applicants: UNIVERSITÄT BERN, Bern (CH); MEDIZINISCHE HOCHSCHULE HANNOVER, Hannover (DE)

(72) Inventors: Sonja Kleinlogel, Bern (CH); Anand David, Mumbai (IN); Hildegard Büning, Hannover (DE)

(73) Assignees: Universität Bern, Bern (CH); Medizinische Hochschule Hannover, Hannover (DE)

( * ) Notice: Subject to any disclaimer, the term of this patent is extended or adjusted under 35 U.S.C. 154(b) by 738 days.

(21) Appl. No.: 17/755,434

(22) PCT Filed: Nov. 2, 2020

(86) PCT No.: PCT/EP2020/080704
§ 371 (c)(1),
(2) Date: Apr. 28, 2022

(87) PCT Pub. No.: WO2021/084133
PCT Pub. Date: May 6, 2021

(65) Prior Publication Data
US 2024/0287542 A1    Aug. 29, 2024

(30) Foreign Application Priority Data
Oct. 31, 2019  (EP) .................... 19206603

(51) Int. Cl.
*C07K 14/015*   (2006.01)
*A61K 9/00*   (2006.01)
(Continued)

(52) U.S. Cl.
CPC ............ *C12N 15/86* (2013.01); *A61K 9/0019* (2013.01); *A61K 9/0048* (2013.01);
(Continued)

(58) Field of Classification Search
None
See application file for complete search history.

(56) References Cited

U.S. PATENT DOCUMENTS

2004/0248202 A1    12/2004    Ruoho et al.
2014/0087463 A1    3/2014    Gautam et al.
(Continued)

FOREIGN PATENT DOCUMENTS

CN    105154470 A    12/2015
EP    3508212 A1    7/2019
(Continued)

OTHER PUBLICATIONS

Wu P, Xiao W, et al Mutational analysis of the adeno-associated virus type 2 (AAV2) capsid gene and construction of AAV2 vectors with altered tropism. J Virol. Sep. 2000;74(18):8635-47. doi: 10.1128/jvi.74.18.8635-8647.2000. PMID: 1095456 (Year: 2000).*
(Continued)

*Primary Examiner* — Evelyn Y Pyla
*Assistant Examiner* — Jagamya NMN Vijayaraghavan
(74) *Attorney, Agent, or Firm* — Greer, Burns & Crain, Ltd.; Steven P. Fallon; E. Kate Berezutskaya

(57) ABSTRACT

The present invention relates to adeno-associated virus capsid polypeptide sequences and their use in therapeutic transgene delivery to the eye and potentially other tissues.

21 Claims, 3 Drawing Sheets

Specification includes a Sequence Listing.

(51) Int. Cl.
A61K 48/00 (2006.01)
A61P 27/02 (2006.01)
C07K 14/005 (2006.01)
C12N 15/86 (2006.01)
A61K 38/00 (2006.01)

(52) U.S. Cl.
CPC .......... *A61K 48/0075* (2013.01); *A61P 27/02* (2018.01); *C07K 14/005* (2013.01); *A61K 38/00* (2013.01); *C07K 2319/33* (2013.01); *C12N 2750/14122* (2013.01); *C12N 2750/14143* (2013.01); *C12N 2750/14145* (2013.01); *C12N 2810/40* (2013.01)

(56) References Cited

U.S. PATENT DOCUMENTS

| | | |
|---|---|---|
| 2022/0387629 A1 | 12/2022 | Kleinlogel et al. |
| 2024/0174743 A1 | 5/2024 | Kleinlogel et al. |

FOREIGN PATENT DOCUMENTS

| | | |
|---|---|---|
| JP | 2019/092457 A | 6/2019 |
| RU | 2664471 C2 | 8/2018 |
| RU | 2703145 C2 | 10/2019 |
| WO | WO 91/12273 A2 | 8/1991 |
| WO | WO 97/05252 A2 | 2/1997 |
| WO | WO 2008/014382 A2 | 1/2008 |
| WO | WO 2009/148946 A2 | 12/2009 |
| WO | WO 2012/051599 A2 | 4/2012 |
| WO | WO 2012/174674 A1 | 12/2012 |
| WO | WO 2013/003557 A1 | 1/2013 |
| WO | WO 2015/126972 A1 | 8/2015 |
| WO | WO 2015/128624 A1 | 9/2015 |
| WO | WO 2015/138616 A1 | 9/2015 |
| WO | WO 2016/134375 | 8/2016 |
| WO | WO 2016/141078 | 9/2016 |
| WO | WO 2016/149664 A1 | 9/2016 |
| WO | WO 2017/197355 | 11/2017 |
| WO | WO 2018/022905 | 2/2018 |
| WO | WO 2018/138616 A1 | 8/2018 |
| WO | WO 2019/006182 | 1/2019 |
| WO | WO 2019/076856 | 4/2019 |
| WO | WO 2019/104279 | 5/2019 |
| WO | WO 2020/148913 A1 | 7/2020 |
| WO | WO 2021/099420 A1 | 5/2021 |
| WO | WO 2021/105509 A1 | 6/2021 |

OTHER PUBLICATIONS

Mary B, Maurya S, Arumugam S, Kumar V, Jayandharan GR. Post-translational modifications in capsid proteins of recombinant adeno-associated virus (AAV) 1-rh10 serotypes. Febs J. Dec. 2019;286(24):4964-4981. doi: 10.1111/febs. 15013. Epub Aug. 1, 2019 PMID: 31330090; Pmcid: PMC7496479. (Year: 2019).*
Reid et al. "Improvement of Photoreceptor Targeting via Intravitreal Delivery in Mouse and Human Retina Using Combinatory rAAV2 Capsid Mutant Vectors," *Invest Ophthalmol Vis Sci.* Dec. 1, 2017:58(14):6429-6439.
International Search Report and Written Opinion of the International Searching Authority received in International Application No. PCT/EP2020/080704, mailed on Mar. 12, 2021 (16 pgs.).
Ballister et al., (2018), "A live cell assay of GPCR coupling allows identification of optogenetic tools for controlling Go and Gi signaling", BMC Biol 16(1):10.
Popova, (2014), "On-Off Interactions in the Retina: Role of Glycine and GABA", Curr Neuropharmacol. 12(6):509-26.
Ablonczy, Z. et al., (2006), "Palmytolation of cone opsins", Vision Research, vol. 46, pp. 4493-4501.
Ahn, K. H. et al., (2010), "Hydrophobic residues in helix 8 of cannabinoid receptor 1 are critical for structural and functional properties.", Biochemistry, vol. 49, No. 3, pp. 502-511.

Altschul, S. F. et al., (1990), "Basic local alignment search tool", J. Mol. Biol., vol. 215, pp. 403-410.
Altschul, S. F. et al., (1997), "Gapped BLAST and PSI-BLAST: a new generation of protein database search programs", Nucleic Acids Res., vol. 25, pp. 3389-3402.
Bailes, H. et al., (2013), "Human melanopsin forms a pigment maximally sensitive to blue light ($\lambda$max $\approx$ 479 nm) supporting activation of G(q/11) and G(i/o) signalling cascades.", Proc. Biol. Sci., vol. 280, p. 20122987.
Boucas, J. et al., (2009), "Engineering adeno-associated virus serotype 2-based targeting vectors using a new insertion site-position 453-and single point mutations.", J Gene Med., vol. 12, pp. 1103-1113.
Bruno, A. et al., (2012), "Membrane-Sensitive Conformational States of Helix 8 in Metabotropic Glu2 Receptor, a Class C GPCR", PLoS ONE, vol. 7, Iss. 8, p. e42023.
Buning, H. et al., (2019) "Capsid Modifications for Targeting and Improving the Efficacy of AAV Vectors.", Mol. Ther. Methods Clin Dev., vol. 12, pp. 248-265.
Cehajic-Kapetanovic, J. et al., (2015), "Restoration of Vision with Ectopic Expression of Human Rod Opsin", Curr. Biol., vol. 25 No. 16, pp. 2111-2122.
Church, D. M. et al., (2011), "Modernizing reference genome assemblies.", PLoS Biol., vol. 9, No. 7, p. e1001091.
Cronin, T. et al., (2014), "Efficient transduction and optogenetic stimulation of retinal bipolar cells by a synthetic adeno-associated virus capdsid and promoter", EMBO Mol. Med., vol. 6, pp. 1175-1190.
Dalkara, D. et al., (2013), "In vivo-directed evolution of a new adeno-associated virus for therapeutic outer retinal gene delivery from vitreous", Sci. Transl. Med., vol. 5, p. 189ra76.
Database: GenBank, [online], Accession No. AC104117.2, *Homo sapiens* chromosome 5 clone RP11-281015, complete sequence, Aug. 27, 2002, Internet, [retrieved on Jul. 5, 2023] URL.
David, A., (2018), "Evolution of Recombinant Adeno-associated Viral Vectors for Application in Ocular Gene Therapy", Doctoral dissertation, Faculty of Medicine of the University of Bern.
Davies, W. et al., (2010), "Vertebrate ancient opsin and melanopsin: divergent irradiance detectors", Photochem. Photobiol. Sci., vol. 9, No. 11, pp. 1444-1457.
Enz, R., (2012), "Structure of metabotropic glutamate receptor C-terminal domains in contact with interacting proteins.", Front Mol. Neurosci., vol. 5, No. 52.
Fritze, O. et al., (2003), "Role of the conserved NPxxY(x)5, 6F motif in the rhodopsin ground state and during activation", Proc. Natl. Acad. Sci., vol. 100, No. 5, pp. 2290-2295.
Gross, A. K. et al., (2009), "Defective Membrane Trafficking of Autosomal Dominant Retinitis Pigmentosa Mutant Ter349Glu Rhodopsin is Rescued by C-Terminal Addition of 1D4 Epitope", iovs, vol. 50, Issue 13.
Hsu, P. D. et al., "Development and Applications of CRISPR-Cas9 for Genome Engineering", Cell., vol. 157, No. 6, pp. 1262-1278.
Hulliger et al. "Empowering Retinal Gene Therapy with a Specific Promoter for Human Rod and Cone ON-Bipolar Cells", Mol Ther Methods Clin Dev. Mar. 13, 2020;17:505-519.
International Search Report and Written Opinion of the International Searching Authority received in International Application No. PCT/EP2020/082588, mailed on Mar. 23, 2021, (11 pages).
International Search Report and Written Opinion of the International Searching Authority received in International Application No. PCT/EP2020/083960, mailed on Apr. 13, 2021, (13 pages).
Kent, W. J. et al., (2002), "The human genome browser at UCSC", Genome Res., vol. 12, No. 6, pp. 996-1006.
Kim, D. S. et al., (2008), "A core paired-type and POU homeodomain-containing transcription factor program drives retinal bipolar gene expression.", J. Neurosci., vol. 28, pp. 7748-7764.
Kim, J-M. et al., (2005), "Light-driven activation of beta 2-adrenergic receptor signaling by a chimeric rhodopsin containing the beta 2-adrenergic receptor cytoplasmic loops", Biochemistry, vol. 44, No. 7, pp. 2284-2292.
Kleinlogel, S., (2016), "Optogenetic user's guide to Opto-GPCRs", Frontiers in Bioscience, (Landmark Ed.), vol. 21, pp. 794-805.

(56) References Cited

OTHER PUBLICATIONS

Kodama, T. et al., (2005), "Expression and localization of an exogenous G protein-coupled receptor fused with the rhodopsin C-terminal sequence in the reitnal rod cells of knockin mice", Exp. Eye Res., vol. 80, No. 6, pp. 859-869.
Kuhlman, B. et al., (2019), "Advances in protein structure prediction and design", Nat. Rev. Mol. Cell. Biol., vol. 20, pp. 681-697.
Kuhn, R. M. et al., (2013), "The UCSC genome browser and associated tools", Brief Bioinform, vol. 14, No. 2, pp. 144-161.
Lagali, P. S. et al., (2008), "Light-activated channels targeted to ON bipolar cells restore visual function in retinal degeneration", Nat. Neurosci., vol. 11, pp. 667-675.
Lin, K. et al., "A simple and fast secondary structure prediction method using hidden neural networks", Bioinformatics, vol. 21, No. 2, pp. 152-159.
Lodowski, K. H. et al., (2013), "Signals Governing the Trafficking and Mistrafficking of a Ciliary GPCR, Rhodopsin", The Journal of Neuroscience, vol. 33, No. 34, pp. 13621-13638.
Long, C. et al., (2018), "Correction of diverse muscular dystrophy mutations in human engineered heart muscle by single-site genome editing", Science Advances, vol. 4, No. 1, p. eaap9004.
Lu, Q. et al., (2016), "AAV-mediated transuction and targeting of retinal bipolar cells with improved mGluR6 promoters in rodents and primates." Gene Ther., vol. 23, No. 8-9, pp. 680-689.
Moreira, I. S., (2014), "Structural features of the G-protein/GPCR interactions", Biochim. Biophys. Acta., vol. 1840, No. 1, pp. 16-33.
Morri, M. et al., (2018), "Optical functionalization of human Class A orphan G-protein-coupled receptors", Nature Communications, vol. 9, No. 1, p. 1950.
Mure, L.S. et al., (2016), "Melanopsin-Encoded Response Properties of Intrinsically Photosensitive Retinal Ganglion Cells", Neuron., vol. 90, No. 5, pp. 1016-1027.
NCBI Resource Coordinators, (2018), "Database Resources of the National Center for Biotechnology Information", Nucleic Acids Res., vol. 46, (D1), pp. D8-D13.
Needleman, S. B. et al., (1970), "A general method applicable to the search for similarities in the amino acid sequence of two proteins", J Mol Biol., vol. 48, No. 3, pp. 443-453.
Neumann, S. et al. "Structural Determinants for G Protein Activation and Selectivity in the Second Intracellular Loop of the Thyrotropin Receptor", Endocrinology. Oct. 21, 2004, vol. 146, No. 1, pp. 477-485.
Ng, D.W. et al. (2007) "Plant SET domain-containing proteins: Structure, function and regulation", Biochimica et Biophysica Acta (BBA)-Gene Structure and Expression, 1769(5-6), pp. 316-329.
Nygaard, R. et al., (2013), "The Dynamic Process of β-Adrenergic Receptor activation", Cell., vol. 152, No. 3, pp. 532-542.
O'Brien, J. A. et al., (2011), "Nano-biolistics: a method of biolistic transfection of cells and tissues using a gene gun with novel nanometer-sized projectiles", BMC Biotechnol., vol. 11, No. 66.
Oh, E. et al., (2010), "Substitution of 5-HT1A receptor signaling by a light-activated G protein-coupled receptor", J. Biol Chem., vol. 285, No. 40, pp. 30825-30836.
Ovchinnikov, Y. et al., (1988), "Two adjacent cysteine residues in the C-terminal cytoplasmic fragment of bovine rhodopsin are palmitylated", FEBS Lett., vol. 230, No. 1-2, pp. 1-5.
Pearson, W. R. et al., (1988), "Improved tools for biological sequence comparison", Proc. Nat. Acad. Sci., vol. 85, No. 8, p. 2444.
Perabo, L. et al., (2003), "In vitro selection of viral vectors with modified tropism: the adeno-associated virus display", Mol. Ther., vol. 8, p. 151-157.
Petrs-Silva, H. et al., (2011) "Novel properties of tyrosine-mutant AAV2 vectors in the mouse retina", Mol. Ther., vol. 19: p. 293-301.
Preibisch, S. et al., (2009), "Globally optimal stitching of tiled 3D microscopic image acquisitions", Bioinformatics, vol. 25, No. 11, pp. 1463-1465.

Prusky, G. T. et al., (2004), "Rapid quantification of adult and developing mouse spatial vision using a virtual optomotor system", Invest. Ophthalmol Vis. Sci., vol. 45, No. 12, pp. 4611-4616.
Santello, M. et al., (2015), "Dysfunction of Cortical Dendritic Integration in Neuropathic Pain Reversed by Serotoninergic Neuromodulation", Neuron., vol. 86, No. 1, pp. 233-246.
Sato, T., (2019), "Conserved 2nd Residue of Helix 8 of GPCR May Confer the Subclass-Characteristic and Distinct Roles through a Rapid Initial Interaction with Specific G Proteins", Int. J. Mol. Sci., vol. 20, No. 7, p. 1752.
Schindelin, J. et al., (2012), "Fiji: an open-source platform for biological-image analysis.", Nat. Methods, vol. 9, No. 7, pp. 676-682.
Schiöth, H.B et al., (2005),"The GRAFS classification system of G-protein coupled receptors in comparative perspective", General and Comparative Endocrinology, vol. 142, No. 1-2, pp. 94-101.
Schwartz, T. W. et al., (2006), "Molecular mechanism of 7TM receptor activation—a global toggle switch model". Annu. Rev. Pharmacol. Toxicol., vol. 46, pp. 481-519.
Siegert, S. et al., (2012), "Transcriptional code and disease map for adult retinal cell types.", Nat. Neurosci., vol. 15, No. 3, pp. 487-495, S1-2.
Siuda, E. R. et al., (2015), "Spatiotemporal control of opioid signaling and behavior", Neuron., vol. 86, No. 4, pp. 923-935.
Smith, T. F. et al., (1981), "Comparison of biosequences", Advances in Applied Mathematics, vol. 2, Issue 4, pp. 482-489.
Somasundaram, P. et al., (2017), "C-terminal phosphorylation regulates the kinetics of a subset of melanopsin-mediated behaviors in mice", Proc. Natl. Acad. Sci. USA., vol. 114, No. 10, pp. 2741-2746.
Sriram, K. et al., (2018), "G Protein-Coupled Receptors as Targets for Approved Drugs: How Many Targets and How Many Drugs?". Mol. Pharmacol. vol. 93, No. 4, pp. 251-258.
Tam, B. M. et al., (2000), "Identification of an outer segment targeting signal in the COOH terminus of rhodopsin using transgenic Xenopus laevis", J. Cell. Biol., vol. 151, No. 7, pp. 1369-1380.
Tichy, A-M. et al., (2019), "Light-activated chimeric GPCRs: limitations and opportunities", Current Opinion in Structural Biology, vol. 57, pp. 196-203.
Tsai, C-J. et al., (2018), "Crystal structure of rhodopsin in complex with a mini-Go sheds light on the principles of G₀ protein selectivity", Sci. Adv., vol. 4, No. 9, p. eaat7052.
Tsai, C-J. et al., (2019), "Cryo-EM structure of the rhodopsin-Gαi-βγ complex reveals binding of the rhodopsin C-terminal tail to the gβ subunit", Elife, vol. 8, p. e46041.
Uhrig, S. et al., (2012), "Successful target cell transduction of capsid-engineered rAAV vectors requires clathrin-dependent endocytosis", Gene Ther., vol. 19, No. 2, pp. 210-218.
Van Wyk, M. et al., (2015), "Restoring the ON Switch in Blind Retinas: Opto-mGluR6, a Next-Generation, Cell-Tailored Optogenetic Tool", PLoS Biol., vol. 13, No. 5, p. e1002143.
Van Wyk, M. et al., (2017), "Present Molecular Limitations of ON-Bipolar Cell Targeted Gene Therapy", Front Neurosci., vol. 11, p. 161.
Vandemoortele, G. et al., (2017), "Robust Generation of Knock-in Cell Lines Using CRISPR-Cas9 and rAAV-assisted Repair Template Delivery", Bio-protocol., vol. 7, No. 7, p. e2211.
Yamashita, T. et al., (2001), "The second cytoplasmic loop of a metabotropic glutamate receptor functions at the third loop position of rhodopsin", Journal of Biochemistry, vol. 130, No. 1, pp. 149-155.
Yevshin, I. et al., (2017), "GTRD: a database of transcription factor binding sites identified by ChIP-seq experiments", Nucleic Acids Res., vol. 45, D1, pp. D61-D67.
Zhu, X. et al., (2003), "GRK1-dependent phosphorylation of S and M opsins and their binding to cone arrestin during cone phototransduction in the mouse retina", J. Neurosci., vol. 23, No. 14, pp. 6152-6160.

* cited by examiner

AAV VECTOR VARIANTS FOR OCULAR GENE DELIVERY

RELATED APPLICATIONS

This application is a U.S. national stage entry under 35 U.S.C. § 371 of international application no. PCT/EP2020/080704, filed Nov. 2, 2020, which designates the U.S. and claims the benefit of priority of European application n. 19206603.3 filed Oct. 31, 2019, incorporated herein by reference in its entirety.

The present invention relates to adeno-associated virus capsid polypeptide sequences and their use in therapeutic transgene delivery to the eye targeting the photoreceptors or retinal pigment epithelial cells.

SEQUENCE LISTING

The instant application contains a Sequence Listing which has been submitted electronically in ASCII format and is hereby incorporated by reference in its entirety. Said ASCII copy, created on Apr. 28, 2022, is named eolf-othd-000002 and is 65,212 bytes in size.

BACKGROUND OF THE INVENTION

Permanent degeneration of light-sensing retinal photoreceptor cells (PRs) causes blindness. Photoreceptor death can be induced by inherited mutations localized mainly in PRs or retinal pigment epithelial (RPE) cells, such as in retinitis pigmentosa (RP), or by a multifactorial condition affecting the health of photoreceptors, such as for example in age-related macular degeneration (AMD). The genetic mutations responsible for many forms of photoreceptor degeneration are identified, enabling interventions by administration of therapeutic transgenes. Existing PR targeting nucleic acid-based therapies are effective only at the early disease stages when damage to PR is minimal. Gene therapy employing a suitable optogenetic protein that confers light sensitivity to functional inner retinal cells might potentially restore vision even in later disease stages. To make such approaches applicable in a clinical setting, improved vectors with better retinal penetration for gene delivery are required.

Recombinant vectors based on adeno-associated virus (AAV) are candidates for therapeutic gene transfer in the eye. Currently, the AAV vectors are typically applied sub-retinally. Subretinal application, however, has been shown to lead to a decrease in retinal thickness and visual acuity. In addition, subretinal application only achieves gene transfer and expression in cells immediately adjacent to the bulk of injected fluid, while an effective administration method should reach cells along the entire width of the retina. Intravitreal injection into the jelly-like filling of the eye (the vitreous humor), does not only have the potential to deliver the vector to the entire retina, but is also much safer and far less technically demanding than subretinal injection. However, the inner limiting membrane (ILM) that separates the neural retina from the vitreous humor is abundant in native receptors of many AAV serotypes and therefore presents a formidable barrier for AAV vectors. Engineered AAV vectors that penetrate better through the ILM and other retinal barriers when delivered intravitreally are needed to increase efficacy and safety of ocular AAV gene therapy.

Based on the above-mentioned state of the art, the objective of the present invention is to provide means and methods for gene transfer into the retina enabling targeting of all retinal cell types, particularly inner retinal cells and photoreceptors. This objective is attained by the subject-matter of the independent claims of the present specification.

SUMMARY OF THE INVENTION

A first aspect of the invention relates to an adeno-associated virus (AAV) capsid polypeptide comprising a peptide insertion at position 453 or 587/588 of the AAV serotype 2 capsid or a position homologous thereto in an AAV capsid of another serotype (Table 3: #1, #2), located at the highest and second highest capsid protrusions, respectively. The peptide insert is selected from the following sequences:

| | |
|---|---|
| SASEAST, | (Cap3; SEQ ID NO 10) |
| DTRPHDQ, | (Cap5; SEQ ID NO 11) |
| EHYNSTC, | (Cap7; SEQ ID NO 12) |
| PNPNCTL, | (Cap9; SEQ ID NO 13) |
| TPPSITA, | (Cap11; SEQ ID NO 14) |
| CGESSYL, | (Cap12; SEQ ID NO 15) |
| PRTPHTA and | (Cap13; SEQ ID NO 16) |
| ELCDGFA. | (Cap14; SEQ ID NO 17) |

The peptide may be flanked by short stretches of other amino acids (1, 2, 3, 4, 5 or even 6 AA). Particular examples of flanking amino acids to embed the indicated sequence at the indicated position within the capsid sequence can be selected from (but are not limited to) Ala, Leu, Gly, Ser, and Thr.

This peptide insert increases the infection efficacy of an adeno-associated virus and/or transduction efficacy of an adeno-associated vector displaying the peptide insert on the capsid surface at 1-587 above indicated position at least for the tested cell types and tissues.

It might as well work at 1-588 or 1-453 due to their cell surface exposure. Without wanting to be bound by theory, the inventors believe that at least part of the effect is due to lower binding to heparan sulphate proteoglycan in vivo.

A second aspect of the invention relates to a nucleic acid sequence encoding the AAV capsid polypeptide according to the first aspect. Particular embodiments include the inclusion of this nucleic acid sequence in an AAV cap sequence, particularly in an AAV serotype 2 capsid sequence for generation of a capsid-engineered AAV vector.

A third aspect of the invention relates to an agent selected from the AAV capsid polypeptide, an AAV vector, and the nucleic acid sequence for treatment of a condition affecting the retina or an RPE cell. Alternative forms of this aspect are embodied by methods of treatment of conditions affecting photoreceptors or RPE cells, comprising the administration of the agent according to the invention to a patient in need thereof.

Administration forms comprising the agents of the invention are further aspects of the invention.

DETAILED DESCRIPTION OF THE INVENTION

Terms and Definitions

Figure 1:
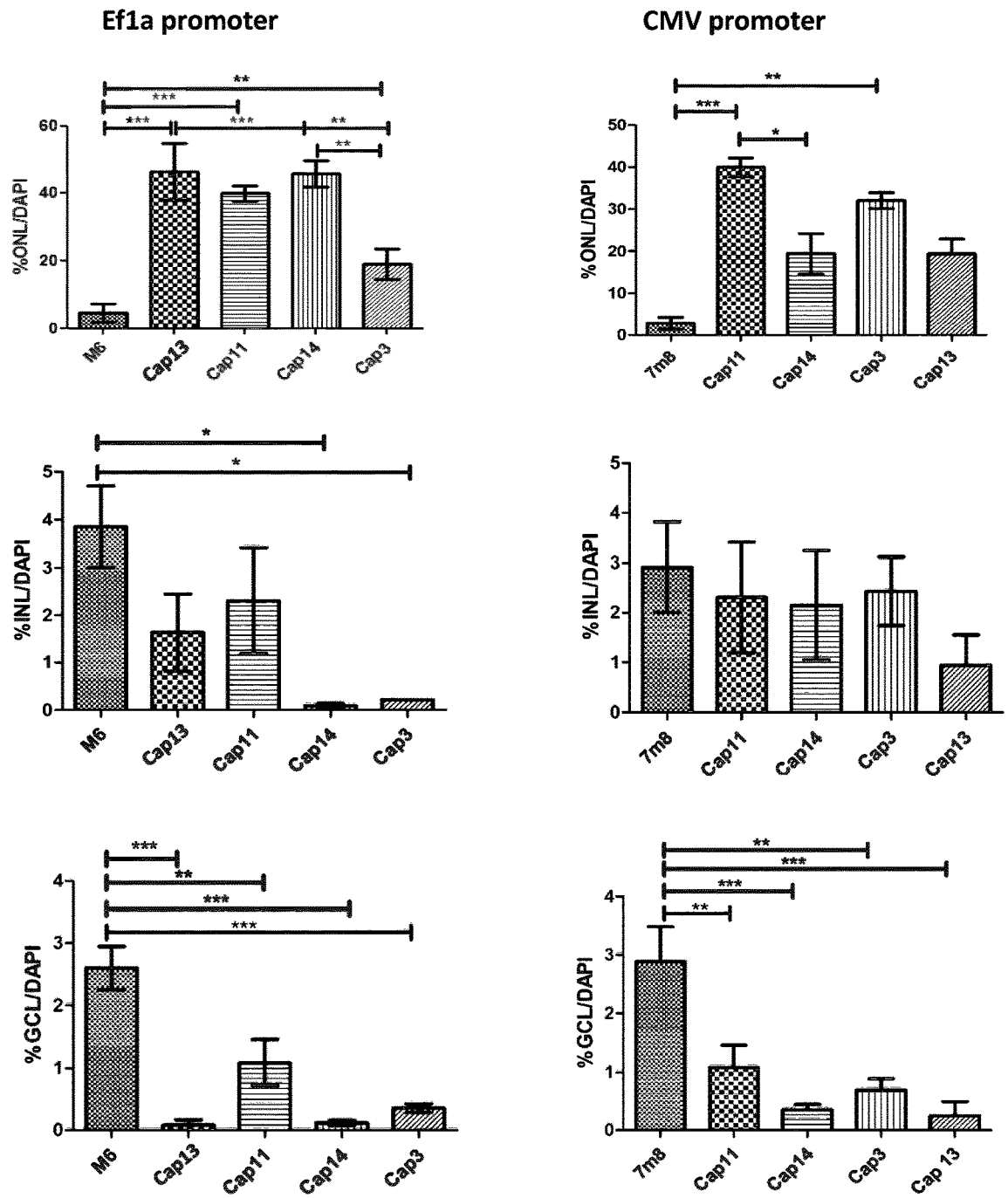
FIG. 1 Retinal layer specificity of expression for selected capsid variants.

The abbreviation AAV in the context of the present specification relates to adeno-associated virus.

The term AAV vector in the context of the present specification relate to a viral vector composed of 60 AAV capsid proteins and an encapsidated AAV nucleic acid. An AAV vector is derived from an AAV virion, but the AAV vector is engineered to be replication-incompetent in the presence of a helper virus by removing the rep and cap genes from the AAV genome. The encapsidated AAV nucleic acid may comprise a transgene which is to be delivered into a target cell.

Unless defined otherwise, all technical and scientific terms used herein have the same meaning as commonly understood by one of ordinary skill in the art (e.g., in cell culture, molecular genetics, nucleic acid chemistry, hybridization techniques and biochemistry). Standard techniques are used for molecular, genetic and biochemical methods (see generally, Sambrook et al., Molecular Cloning: A Laboratory Manual, 2d ed. (1989) Cold Spring Harbor Laboratory Press, Cold Spring Harbor, N.Y. and Ausubel et al., Short Protocols in Molecular Biology (1999) 4th Ed, John Wiley & Sons, Inc.) and chemical methods.

The term AAV capsid in the context of the present specification relates to a polypeptide encoded by engineered capsid (cap) genes generated by the inventors and listed herein below. The AAV capsid disclosed herein may be used to assemble recombinant adeno-associated viral vectors for gene therapy.

Reference to an amino acid position in the AAV capsid in the context of the present specification relates to the capsid amino acid sequence of adeno-associated virus 2 capsid protein VP1 having the sequence of SEQ ID NO. 1 (Table 2) (GenBank accession number of the corresponding nucleic acid sequence is J01901.1). The corresponding amino acid positions for other homologous adeno-associated virus serotypes are shown in Table 3.

The term homologous in the context of the present specification relates to nucleic acid or amino acid sequences derived from different serotypes of AAV. The corresponding positions of different adeno-associated virus serotypes are shown in Table 3.

The term transgene in the context of the present specification relates to a gene or genetic material that has been transferred from one organism to another. In the present context, the term may also refer to transfer of the natural or physiologically intact variant of a genetic sequence into tissue of a patient where it is missing. It may further refer to transfer of a natural encoded sequence the expression of which is driven by a promoter absent or silenced in the targeted tissue.

The term recombinant in the context of the present specification relates to a nucleic acid, which is the product of one or several steps of cloning, restriction and/or ligation and which is different from the naturally occurring nucleic acid. A recombinant virus particle comprises a recombinant nucleic acid.

The term intravitreal administration in the context of the present specification relates to a route of administration of a pharmaceutical agent, for example a viral vector, in which the agent is delivered into the vitreous body of the eye. Intravitreal administration is a procedure to place a medication directly into the space in the back of the eye called the vitreous cavity, which is filled with a jelly-like fluid called the vitreous humour gel.

The term subretinal administration in the context of the present specification relates to a route of administration of a pharmaceutical agent, particularly a viral vector in the context of this specification, into the space between retinal pigment epithelium (RPE) cells and photoreceptors.

The term polypeptide in the context of the present specification relates to a molecule consisting of 50 or more amino acids that form a linear chain wherein the amino acids are connected by peptide bonds. The amino acid sequence of a polypeptide may represent the amino acid sequence of a whole (as found physiologically) protein or fragments thereof. The term "polypeptides" and "protein" are used interchangeably herein and include proteins and fragments thereof. Polypeptides are disclosed herein as amino acid residue sequences.

Amino acid residue sequences are given from amino to carboxyl terminus. Capital letters for sequence positions refer to L-amino acids in the one-letter code (Stryer, Biochemistry, $3^{rd}$ ed. p. 21). Lower case letters for amino acid sequence positions refer to the corresponding D- or (2R)-amino acids. Sequences are written left to right in the direction from the amino to the carboxy terminus. In accordance with standard nomenclature, amino acid residue sequences are denominated by either a three letter or a single letter code as indicated as follows: Alanine (Ala, A), Arginine (Arg, R), Asparagine (Asn, N), Aspartic Acid (Asp, D), Cysteine (Cys, C), Glutamine (Gln, Q), Glutamic Acid (Glu, E), Glycine (Gly, G), Histidine (His, H), Isoleucine (Ile, I), Leucine (Leu, L), Lysine (Lys, K), Methionine (Met, M), Phenylalanine (Phe, F), Proline (Pro, P), Serine (Ser, S), Threonine (Thr, T), Tryptophan (Trp, W), Tyrosine (Tyr, Y), and Valine (Val, V).

The term variant refers to a polypeptide that differs from a reference polypeptide, but retains essential properties. A typical variant of a polypeptide differs in its primary amino acid sequence from another polypeptide used as reference. Generally, differences are limited so that the sequences of the reference polypeptide and the variant are closely similar overall and, in many regions, identical. A variant and reference polypeptide may differ in amino acid sequence by one or more modifications (e.g., substitutions, additions, and/or deletions). A variant of a polypeptide may be naturally occurring such as an allelic variant, or it may be a variant that is not known to occur naturally.

The term biological activity in the context of the present specification relates to a specifically measurable quantity displayed by certain variants of the polypeptides enclosed herein. For example, in the context of a viral vector's ability to facilitate gene transfer into a retinal cell, the biological activity of a capsid variant may be assayed by measuring expression of a transgene (e.g. firefly luciferase) into cultured cells or into a model organism in-vivo in a standard assay.

In the context of the present specification, the terms sequence identity and percentage of sequence identity refer to the values determined by comparing two aligned sequences. Methods for alignment of sequences for comparison are well-known in the art. Alignment of sequences for comparison may be conducted by the local homology algorithm of Smith and Waterman, Adv. Appl. Math. 2:482 (1981), by the global alignment algorithm of Needleman and Wunsch, J. Mol. Biol. 48:443 (1970), by the search for similarity method of Pearson and Lipman, Proc. Nat. Acad. Sci. 85:2444 (1988) or by computerized implementations of these algorithms, including, but not limited to: CLUSTAL, GAP, BESTFIT, BLAST, FASTA and TFASTA. Software for performing BLAST analyses is publicly available, e.g., through the National Center for Biotechnology-Information (http://blast.ncbi.nlm.nih.gov/).

One example for comparison of amino acid sequences is the BLASTP algorithm that uses the default settings: Expect threshold: 10; Word size: 3; Max matches in a query range: 0; Matrix: BLOSUM62; Gap Costs: Existence 11, Extension 1; Compositional adjustments: Conditional compositional score matrix adjustment. One such example for comparison of nucleic acid sequences is the BLASTN algorithm that uses the default settings: Expect threshold: 10; Word size: 28; Max matches in a query range: 0; Match/Mismatch Scores: 1.-2; Gap costs: Linear. Unless stated otherwise, sequence identity values provided herein refer to the value obtained using the BLAST suite of programs (Altschul et al., J. Mol. Biol. 215:403-410 (1990)) using the above identified default parameters for protein and nucleic acid comparison, respectively.

In the context of the present specification, the term amino acid linker refers to an oligopeptide of variable length that is used to connect two polypeptides in order to generate a single chain polypeptide. Exemplary embodiments of linkers useful for practicing the invention specified herein are oligopeptide chains consisting of 1 to 6 amino acids. A non-limiting example of an amino acid linker is AAA or AA, as exemplified below.

AAV is a small non-pathogenic virus that infects humans and other primate species.

The AAV2 infection starts by docking to the cell surface receptor heparan sulphate proteoglycan (HSPG). Its low-affinity binding to glycans induces a reversible structural rearrangement of the capsid that promotes binding to the co-receptor αvβ65 or α5β1 integrin inducing formation of a clathrin-coated pit. The clathrin-coated pit becomes internalized via endocytosis and the viral particles are transported to the nucleus. The pH drops due to acidification of the endosomal compartments, which is a feature of the endosomal vesicle maturation. Acidification-triggered conformational change takes place in the capsid, and the virus escapes from the late endosome by lipolytic pore formation.

In wild-type AAV the genome is built of a 4.7 kilobase long single stranded DNA (ssDNA), either positive- or negative-sensed. The genome comprises three open reading frames (ORFs) flanked by inverted terminal repeats (ITRs). The ITRs are self-complementary, CG-rich, T-shaped hairpins at the 5' and 3'-end of the AAV genome and the only necessary viral component present in recombinant vector genomes. The ITR include a terminal resolution site (TRS) and a Rep binding element (RBE), which facilitate replication and encapsidation of the viral genome. The ORFs encode the genes rep, cap, AAP. Four multifunctional non-structural Rep proteins encoded by rep are required for the AAV life cycle. Cap encodes the capsid proteins VP1, VP2 and VP3, which interact together to form a capsid of an icosahedral symmetry, and the assembly-activating protein (AAP), which is required for stabilizing and transporting newly produced VP proteins from the cytoplasm into the cell nucleus. All three VPs are translated from one mRNA and spliced differently. The largest 90 kDa VP1 is an unspliced transcript, the 72 kDa VP2 is translated from a non-conventional ACG start codon whereas the smallest 60 kDa VP3 is translated from an AUG codon. All the three VPs have overlapping C-termini.

The VP3 constitutes 90% of the capsid and VP1 and VP2 share a common C-terminal amino acid sequence with VP3 but have N-terminal extensions that stay buried inside the capsid. The VP1 unique N-terminal sequence contains phospholipase A2 (PLA2) activity that is required for infection, and nuclear localization signals. The three VP monomers assemble into two-fold, three-fold, and five-fold axes of symmetry to create the 60-subunit of AAV capsid. A first aspect of the invention relates to an adeno-associated virus (AAV) capsid polypeptide comprising a peptide insert at a peak or a spiky protrusion at position 453 or 587 of the AAV serotype 2 capsid. The peptide insert is selected from the following sequences:

```
                                    (Cap3; SEQ ID NO 10)
            SASEAST, (Cap5; SEQ ID NO 11)
            DTRPHDQ, (Cap7; SEQ ID NO 12)
            EHYNSTC, (Cap9; SEQ ID NO 13)
            PNPNCTL, (Cap11; SEQ ID NO 14)
            TPPSITA, (Cap12; SEQ ID NO 15)
            CGESSYL, (Cap13; SEQ ID NO 16)
            PRTPHTA
            and (Cap14; SEQ ID NO 17)
            ELCDGFA,
``` particularly the insert is selected from SASEAST (Cap3; SEQ ID NO 10), TPPSITA (Cap11; SEQ ID NO 14), PRTPHTA (Cap13; SEQ ID NO 16) and ELCDGFA (Cap14; SEQ ID NO 17).

The peptide insert as laid out above may be comprised in a 7-13mer consisting of one of the above sequence, flanked by 0-6 linker amino acids (6 being the maximum number of the total of N and C terminally flanking amino acids) selected from, but not limited to, Ala, Leu, Gly, Ser, and Thr inserted N- and/or C-terminally of the insert sequences given in the preceding paragraph.

Any position given for AAV2 sequences given herein is in relation to the reference sequence accessible at GenBank entry No. J01901.1 (Adeno-associated virus 2, complete genome). The corresponding amino acid sequence is given as SEQ ID NO 1 in table 2.

Spiky protrusions (peaks) represent the most exposed regions of the capsids. The highest peak is located at amino acid position 453 and second highest at position 587 on the AAV2 capsid. These peaks accept peptide insertions without disturbing capsid assembly and provide opportunities for targeting non-permissive cells. Likewise, protrusions represent critical sites of AAVs host interaction, receptor binding and immunogenicity. Of note, in certain embodiments, R585 and 588 are mutated to attain optimal efficiency if the insert is inserted at position 453.

When referring to a certain peak or a spiky protrusion position, where the peptide insert is introduced, it is to be understood that the peptide insert may be directly after (in C-terminal direction) this position or one to six amino acids further in C-terminal direction. For example, the peptide insert defined to be at position 587 (an insertion defined as between the pre-insertion positions 587 and 588) may start at position 588 or 589 (one or two amino acids further in C-terminal direction) or 590 (three amino acids further in C-terminal direction). All of these insert positions allow for peptide inserts that do not disturb the overall capsid structure, but rather may increase transduction efficacy.

This peptide insert increases the retinal penetration and transduction efficacy of the virus after intravitreal delivery.

In certain embodiments, the peptide insert is selected from SASEAST (Cap3; SEQ ID NO 10), DTRPHDQ (Cap5; SEQ ID NO 11), EHYNSTC (Cap7; SEQ ID NO 12), PNPNCTL (Cap9; SEQ ID NO 13), TPPSITA (Cap11; SEQ ID NO 14), CGESSYL (Cap12; SEQ ID NO 15), PRTPHTA (Cap13; SEQ ID NO 16) and ELCDGFA (Cap14; SEQ ID NO 17), In certain embodiments, the peptide insert is selected from SASEAST (Cap3; SEQ ID NO 10), TPPSITA (Cap11; SEQ ID NO 14), PRTPHTA (Cap13; SEQ ID NO 16) and ELCDGFA (Cap14; SEQ ID NO 17).

The peptide insert can be present in the AAV capsid polypeptide as is or in the context of 1, 2, 3 or 4 flanking spacer amino acids at the amino terminus and/or at the carboxyl terminus.

Suitable spacer AAs include, but are not limited to alanine, leucine, glycine, threonine and serine.

In the inventors' examples, due to the cloning strategy used, the insertion between $N_{587}$ and $R_{588}$ of the AAV2 VP1 is a 12mer of the form $R_{585}$G N A A A $X_1$ $X_2$ $X_3$ $X_4$ $X_5$ $X_6$ $X_7$-A A $R_{588}$ Q A A, whereas $X_1$-$X_7$ represents the inserted heptamer oligo and A the flanking linkers. It is to be understood that this is an example only and the invention is not limited to inserts exactly at this position having exactly these flanking sequences.

In embodiments relating to an inserting position designated 587 in AAV2, the oligo is always inserted between positions 587 and 588 on VP1 of AAV2. It is an insertion, so the VP1 AAV2 numbering does not change and subsequent positions are counted "without the insert" with respect to substitutions and the like. The inserted peptide contains the heptamer as specified herein, but may potentially also be shorter to function or longer. In embodiments represented in the examples, the inventors inserted a 12-mer in the form of AAA-X1X2X3X4X5X7-AA, whereas the linker amino acids can be freely selected from Ala, Leu, Gly, Ser, Thr. The N- and C-terminal linkers can be of 0-5 AA length. In certain embodiments, an insertion peptide can be of 5-13 amino acids length, comprising 0-6 linker amino acids.

In certain embodiments, the peptide insertion (elsewhere in this specification referred to as "oligo") can move 1-5AA further to the C-terminus. For AAV2, the insertion site can also be at (e.g., immediately C-terminal to) amino acid 453.

According to an alternative of this first aspect of the invention, any of the peptide sequences recited above are inserted at position 453 of SEQ ID NO 001 instead of position 587. Again, the position of insertion may vary and the peptide sequence may be flanked by inserts as discussed above and may consist of 5-13 AAs. In addition to the peptide insertion at position 453, R587A and R588A mutations may be introduced into VP1 of AAV2 (Boucas J et al.

J Gene Med. 2009 December; 11(12):1103-13. doi: 10.1002/jgm.1392) According to another alternative of this aspect of the invention, a position homologous to position 587/588 or 453 in AAV serotype 2 can be selected (Table 3: #1, #2) to construct an AAV of another serotype with one of the inserted peptide sequences recited above.

In certain embodiments, the AAV capsid protein is characterized by one or several tyrosine to phenylalanine substitutions of tyrosine residues, wherein the tyrosine residues occur in the wild-type capsid sequence at positions 252, 272, 444, 500, 700, 704 and 730.

Certain of the capsid variants herein were selected by evolutionary methods in the context of a tyrosine-modified capsid.

In certain embodiments, the AAV capsid protein is characterized by one or several tyrosine to phenylalanine substitutions at positions 252, 272, 444, 500, 704 and 730.

In certain even more particular embodiments, the AAV capsid protein is characterized by several tyrosine to phenylalanine substitutions at all of the positions 252, 272, 444, 500, 700 and 730.

According to another alternative of this aspect of the invention, a tyrosine position homologous to any of the positions 252, 272, 444, 500, 700, 704 and 730 in AAV serotype 2 can be selected for substitution to phenylalanine (Table 3: #3-#9) to construct an AAV of another serotype with tyrosine to phenylalanine substitutions. Also, other tyrosine positions may be substituted for phenylalanine.

In certain embodiments, the AAV capsid protein is characterized by one or several threonine to valine substitutions, particularly T491V.

According to another alternative of this aspect of the invention, a threonine position homologous to the position 491 in AAV serotype 2 can be selected for substitution to valine (Table 3: #10) to construct an AAV of another serotype with a threonine to valine substitution.

In certain embodiments, the tyrosine to phenylalanine substitutions mentioned above are combined with the threonine to valine substitutions, particularly T491V.

Y-F and T-V mutations decrease ubiquitination and thus proteasomal degradation of the viral particle once internalized by the cell, thereby increasing transduction efficacy.

In certain embodiments, the adeno-associated virus capsid polypeptide comprises the amino acid sequence selected from SEQ ID NO 2-SEQ ID NO 9, or a sequence having at least 85% identity thereto and at least 90% of the biological activity of a sequence selected from SEQ ID NO 2-SEQ ID NO 9.

Biological Activity Assay:

Wherever reference is made herein to a polypeptide "having at least a certain percentage of the biological activity of a (reference) sequence", this biological activity can be measured as follows:

HEK293 cells are co-transfected with a plasmid encoding the test or the reference polypeptide, the plasmid harbouring helper adenoviral genes and a transgene plasmid, selected from scCMV-mCitrine, scEf1a-mCitrine, scCMV-EGFP, scEf1a-EGFP as a reporter, using the calcium-phosphate precipitation method. Vectors containing the transgene are concentrated by density purification over an iodixanol gradient (Axis-Shield, Oslo) and the 40% iodixanol fraction subsequently buffer exchanged by for example amicon filtration (Millipore). The AAV fraction is titered for DNase-resistant vector genomes by real-time PCR relative to a standard vector. 3 μl of viral vector are intravitreally injected into anaesthetized (100 mg/kg ketamine and 10 mg/kg xylazine) wild type C57BL/6J mice. For injections, the virus is titer-matched to E11 GC/ml and 3 ul thereof is injected—i.e. 3×E8 vg per eye. Mouse retinas are removed 3 weeks post-injection for immunohistochemical analysis. Mouse eyes retinal explants (7 days post-transduction) are fixed with 4% (wt/vol) paraformaldehyde in PBS for 40 min at room temperature (RT), cryoprotected over three consecutive nights at 4° C. in graded sucrose solutions (10%, 20%, and 30% sucrose in PBS), embedded in cryomolds with O.C.T. compound (Sakura Finetek), and frozen in liquid nitrogen-cooled 2-methylbutane. Vertical sections of 10 μm thickness are cut on a cryostat, mounted on SuperFrost glass slides (Menzel) and immunohistochemically labelled with suitable primary and secondary antibodies to detect EGFP, YFP, mCitrine or Turbo635 fluorescence as well as specific retinal cell types. The reporter expression in the target cell type is quantified, typically by fluorescence, and compared to the amount of reporter in the remainder of the tissue to assess the biological activity of the engineered virus capsid. Another measure for biological activity of the engineered virus capsid is the percentage of target cells transduced and the area of tissue expressing. For the avoidance of doubt, the assay quantifying reporter expression in the target cell type and comparing to the amount of reporter in the remainder of the tissue is employed when measuring the biological activity.

A second aspect of the invention relates to a nucleic acid sequence encoding the AAV capsid polypeptide according to the first aspect.

In particular embodiments, the AAV sequence according to the invention does not contain a Rep element required for integration into a host genome. Non-integrating viruses are safer for application in humans. In certain embodiments, the nucleic acid sequence is designed according to the self-complementary AAV vector genome concept. In all cases a single stranded DNA sequence is used.

In certain embodiments, the nucleic acid sequence comprises a transgene with or without regulatory sequences.

In certain embodiments, the transgene encodes the sequence of a correct protein (i.e. RPE65), a siRNA or shRNA (designed to target regions of mRNA to degrade wild-type and mutant RNA of dominant disease-causing genes), or a CRISPR/Cas-gRNA cassette for gene editing.

In certain embodiments, the transgene encodes a light-sensitive protein, such as an invertebrate or vertebrate opsin or a variant thereof.

In certain embodiments, the transgene encodes channelrhodopsin-2 or a variant thereof.

In certain embodiments, the transgene encodes a microbial light-gated inhibitory ion pump, such as for example halorhodopsin (eNpHR) or archaerhodopsin (ArchT).

In certain embodiments, the transgene encodes a GPCR opsin such as for example human rhodopsin, melanopsin or a cone opsin.

In certain embodiments, the transgene encodes an acceptor protein for a photo-switchable ligand.

In certain embodiments, the transgene is under control of a promoter sequence operable in a mammalian cell. In certain embodiments, the promoter sequence is operable in a human retinal cell.

In certain embodiments, the promoter is a ubiquitous promoter. In certain embodiments, the promoter is a cell-specific promoter.

In certain embodiments, the promoter is a CMV immediate early promoter. In certain embodiments, the promoter is a human Ef1a promoter. In certain embodiments, the promoter is a photoreceptor specific promoter.

A third aspect of the invention relates to an agent selected from the AAV capsid polypeptide according to the first aspect, an AAV vector comprising a capsid polypeptide according to the first aspect, and a nucleic acid sequence according to the second aspect, for use in medicine/as a medicament.

In certain embodiments, AAV vectors are used to transduce cells of the eye.

The eye is made up of three layers, composed of various anatomical structures. The fibrous tunic is the outermost layer and is composed of the cornea and sclera. The vascular tunic or uvea is the middle layer and consists of the choroid, ciliary body, pigmented epithelium and the iris. The retina is the innermost layer, which gets its oxygenation from the blood vessels of the choroid (posteriorly) as well as the retinal vessels (anteriorly).

The spaces between the cornea and lens are filled with the aqueous humour, and the entire posterior cavity behind the lens is filled with the vitreous body, a jelly-like substance. The vitreous body is composed of water, collagen, fibrils, hyaluronic acid and ions. The void spaces in the retina that are not occupied by neurons or blood vessels; are filled by the processes of Müller glial cells that span all the retinal cell layers.

The outer limiting membrane (OLM) of the retina is formed from junctions between Müller cells (MCs) and inner segments of photoreceptor cells and acts as a metabolic barrier between the subretinal space, restricting passage of large molecules. The inner limiting membrane (ILM) of the retina is formed by lateral connection between MCs end-feet and basement membranes and acts as a diffusion barrier between the vitreous humor and the neural retina.

The retina is composed of macula, optic disc, fovea and peripheral retina. A photoreceptor cell is a specialized type of neuroepithelial cell found in the retina. Three types of photoreceptor cells are known: rods, cones, and photosensitive retinal ganglion cells. The rods are distributed at the peripheral region of the retina; whereas the central pigmented region called macula is enriched for cone photoreceptor cells. The retinal pigment epithelium (RPE) provides nutrition and maintains the health of photoreceptor cells. The nuclei of photoreceptor cells constitute the outer nuclear layer (ONL) whereas the nuclei of bipolar, amacrine and horizontal cells are located in the inner nuclear layer (INL).

In certain embodiments, the agent selected from the AAV capsid polypeptide according to the first aspect, an AAV vector comprising a capsid polypeptide according to the first aspect, and a nucleic acid sequence according to the second aspect, is for use in treatment of a condition affecting
  a. a retinal or retinal pigment epithelium cell and/or
  b. a photoreceptor, a bipolar cell, an amacrine cell or a ganglion cell of the retina.

In certain embodiments, the agent is for use in treatment of glaucoma, retinitis pigmentosa, macular degeneration, retinoschisis, Leber's Congenital Amaurosis, diabetic retinopathy, achromatopsia, or color blindness, melanoma-associated retinopathy, congenital stationary night blindness, cone-rod dystrophy, late stage age-related macular degeneration, maculopathies, early onset severe retinal dystrophy, achromatopsia, ocular albinism, oculocutaneous albinism, Stargardt disease, choroideremia, Spinocerebellar Ataxia type 7 (SCAT), lysosomal storage diseases that affect the cornea, such as Mucopolysaccharidosis (MPS) IV and MPS VII, retinoblastoma, ocular melanoma, hypertensive retinopathy.

In certain embodiments, the agent of the invention can be employed for treatment or prevention of a disease affecting the inner ear.

In certain embodiments, the agent is administered by
a. intravitreal administration, particularly by intravitreal injection, or by
b. subretinal administration.

In certain embodiments, the agent is delivered to the posterior segment, the anterior segment, the sclera, the choroid, the conjunctiva, the iris, the lens, or the cornea.

Similarly, within the scope of the present invention is a method or treating a condition selected from rod-cone dystrophies including retinitis pigmentosa, cone-rod dystrophies including macular degeneration and congenital stationary night blindness (CSBN1) in a patient in need thereof, comprising administering to the patient a viral vector comprising an AAV capsid and/or a nucleic acid sequence according to the above description.

Similarly, a dosage form for the prevention or treatment of a condition selected from cone-rod dystrophies, rod-cone dystrophies and congenital stationary night blindness is provided, comprising an AAV capsid and/or a nucleic acid sequence according to one of the above aspects of the invention.

The agents and methods disclosed herein do also provide significant advantages in early disease stages when damage to PR is small, as the vectors facilitated by the invention are more efficient than any existing alternatives.

Wherever alternatives for single separable features such as, for example, an AAV serotype protein or capsid peptide insert sequence or medical indication are laid out herein as "embodiments", it is to be understood that such alternatives may be combined freely to form discrete embodiments of the invention disclosed herein.

The invention is further illustrated by the following examples and figures, from which further embodiments and advantages can be drawn. These examples are meant to illustrate the invention but not to limit its scope.

DESCRIPTION OF THE FIGURES

FIG. 1 Cell specificity of expression for selected capsid variants compared to the selection backbone AAV2 (Y252, 272, 444, 500, 700, 730F), referred to in the following as AAV2(M6), and the state-of-the-art synthetic capsid AAV2 (7m8). All AAVs have been packaged as self-complementary (scAAVs) expressing either eGFP or mCitrine under two ubiquitous promoters hEF1a and CMV in order to remove the possible bias of one promoter towards a certain retinal cell type. Expression in photoreceptors (ONL) is significantly enhanced for the novel variants after intravitreal injection as opposed to AAV2(M6) and AAV2(7m8). 2.5 µl injected intravitreally, titer matched to 1E+11 vg/ml (except Cap14 at 3E+10). 4 retinas counted, mean±s.d. INL, inner nuclear layer; GCL, ganglion cell layer; DAPI, number of all cell bodies stained with the nuclear stain DAPI.

Figure 2:
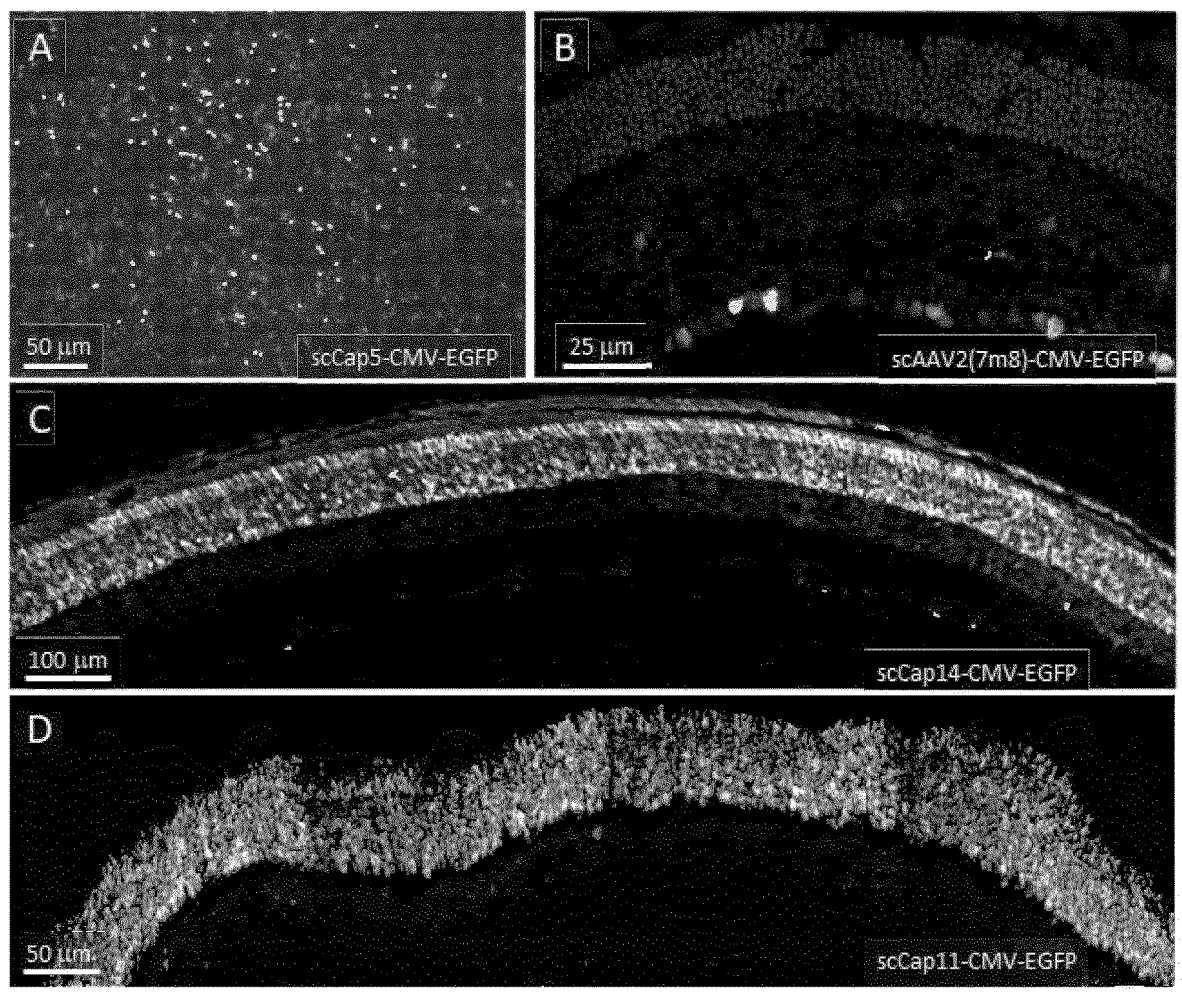
FIG. 2 Examples of pan-retinal transgene expression throughout the outer murine retina after intravitreal injection.

FIG. 2 Panretinal strong expression throughout the ONL for novel capsid variants as indicated at 100× reduced functional titer compared to state-of-the art AAV2(7m8). All injections were titer-matched and 7.4E+7 vg delivered into the vitreous of C57BL/6 mice. A. Low magnification picture focused on the ONL of a mouse retinal whole mount after transduction with scCap5-CMV-EGFP. B-C. Vertical retinal cryosection. From the photomicrograpsh the potency of the novel capsids at low titer compared to AAV2(7m8) is obvious.

Figure 3:
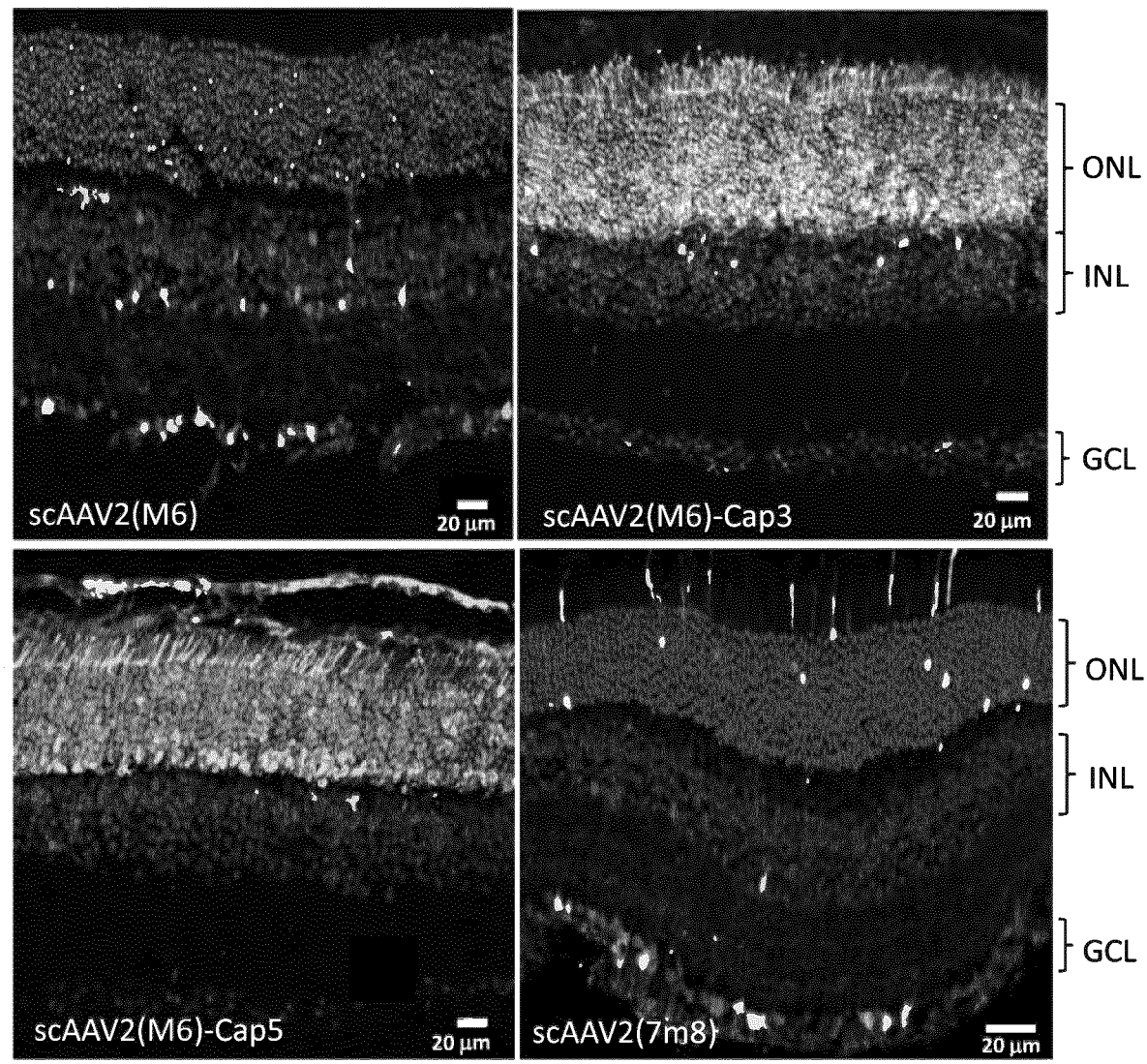
FIG. 3 Comparison of transgene expression delivered by novel capsids with AAV2(M6) and AAV2(7m8) after intravitreal injection into the mouse eye.

FIG. 3 Comparison of transduction after intravitreal injection of 2.5 µl scAAV into C57BL/6 mouse eyes (as described e.g. in van Wyk et al., PLoS Biol, 2015. 13(5): p. e1002143). mCitrine expression under control of the human Ef1a promoter, titers matched to 1E+11 vg/ml. From the photomicrographs of vertical and immunolabeled retinal cryosections it is obvious that scAAV2(Cap3) and scAAV2(Cap5) penetrate better through the ILM and retinal layers and show an unparalleled expression efficacy in the photoreceptors of the ONL when compared to state-of-the art AAV(7m8) or the crude library backbone AAV2(M6).

EXAMPLES

Example 1: Generation of Peptide Display Library

The AAV capsid is an icosahedron with 60 subunits. At the 3-fold axes of the AAV capsid, which are formed when the capsid subunits assemble, spiky protrusions (peaks) are formed, that represent the most exposed regions of the capsid. On the AAV2 capsid, the highest peak is located at amino acid (AA) position 453 and the second highest at AA positions 587/588 (AAV2-VP1 numbering). These peaks accept peptide insertions without disturbing the viral capsid assembly and represent critical sites of host interaction, receptor binding and immunogenicity. To generate a peptide display library the inventors inserted a randomized heptapeptide between $N_{587}$ and $R_{588}$ of the open reading frame of VP1 of AAV2 containing six additional tyrosine to phenylalanine mutations (Y252,272,444, 500, 700, 730F), referred to as AAV2(M6) (Table 2). Y-F and T-V mutations (Buning & Srivastava, Mol Ther Methods Clin Dev. 2019 Jan. 26; 12:248-265. doi: 10.1016/j.omtm.2019.01.008) were previously shown to decrease ubiquitination and thus proteasomal degradation of the viral particle once internalized by the cell (Petrs-Silva et al., Mol Ther, 2011. 19: p. 293-301.) thereby increasing transduction efficacy and potentially favoring the selection process in an in vivo evolution where variants are in the initial rounds represented at very low counts. Random insertions can be made at homologous sites in the GH loops (loop IV) of other capsid serotypes, as shown in Table 3. The approach on how the inventors developed the library was adopted from Perabo and colleagues (Perabo et al., Mol Ther, 2003. 8: p. 151-157). Two unique restriction sites, AscI and NotI, were introduced between amino acids 587 and 588 of the AAV2(M6) genome (Table 2). The introduced DNA fragment forming the AscI and NotI sites encoded a stop codon flanked by alanine linkers (AAAstopAA). Next, a single-stranded randomized 7mer pool with NNB codons was synthesized as (SEQ ID NO 25)
5'-TTGGCGCGCCGCVNNVNNVNNVNNVNNVNNVNNGGCGGCCGCTTTTT

TCCTTGA-3'

(Eurofins Genomics) and converted into a pool of dsDNA fragments by second-strand synthesis using the antisense primer 5'-CTCAAGGAAAAAAGC-3' (SEQ ID NO 26). To generate the 7mer display library, the dsDNA random oligonucleotides were cloned into the AscI-NotI site of the modified AAV(M6) genome thereby replacing the stop codon. The virus library was generated such that each viral genome was packaged or encapsidated within the capsid protein variant which that genome encoded (genotype-phenotype coupling). In addition, all capsids were produced in a way that only one kind of peptide was present in each of the 60 subunits. In this way, functional improvements identified through selection can be linked to the genome sequence encoding this improved function contained within the viral capsid.

Example 2: Selection of Peptide Variants

This library was subjected to positive selection within C57BL/6_Opto-mGluR6 mice, generated by our laboratory (van Wyk et al., PLoS Biol, 2015. 13(5): p. e1002143), expressing the red fluorescent marker FP635 in retinal ON-bipolar cells. This mouse line was selected based on the rationale that ON-bipolar cells are located deep within the retina and are known not to be permissive to AAV transduction, so that the selection would favor well penetrating AAVs and variants with advantageous properties to transduce ON-bipolar cells. In brief, 5-8 transgenic mice of 4-6 weeks of age were injected intravitreally with 2.5 µl of iodixanol-purified library with a genomic titer of approximately $5 \times 10^{11}$ viral genomes (vg)/ml into both eyes as described in (van Wyk et al., PLoS Biol, 2015. 13(5): p. e1002143; van Wyk et al., Front Neurosci, 2017. 11: p. 161).

After 10 days, eyes were enucleated and retina dissociated using a light papain protease treatment, followed by fluorescence activated cell sorting (FACS) of the ON-bipolar cell population. Successful virions were then PCR-amplified from DNA extractions and further cloned and repackaged for subsequent rounds of injections.

At each cloning step of 7mer oligos into the AAV2(M6) genome, four parallel ligations were run and 12 clones of each pool plated and sequenced to estimate convergence of the library after each in vivo selection step. This process of in vivo directed evolution created ON-bipolar cell permissive AAV variants through the application of positive selection, similar to the process of natural evolution.

From the in vivo selected library the capsid genes of 81738 variants were identified by next-generation sequencing. 15 heptapeptide sequences from the top 67 ranked were selected for functional evaluation and characterization as outlined in table 1, on a combination of high overall transduction efficacy (accumulation in NGS), a preference for ON-bipolar cell targeting and motifs that either appeared early in the selection rounds or that looked promising in terms of their amino acid sequence (i.e. containing negatively charged residues or proline residues). A key characteristic of all library variants is the separation of the positive charges ($R_{585}$ and $R_{588}$) of the heparan sulphate proteoglycan binding motif of AAV2 through the insertion. However, the peptide sequence together with the two alanine of the linker sequence can re-install the ability to bind to heparan sulphate proteoglycan (Uhrig . . . Buñing, Gene Therapy). Among the 7mer insert sequences, there were moderate preferences at particular positions, e.g. charged amino acids at position 1 or 2 and/or at position 5 or 6 and a polar amino acid, such as Cys or Ala at position 7 (Table 1).

Example 3: Evaluation of Novel Capsid Variants

A recombinant form of AAV2(M6)~7mer~was cloned for all 15 selected peptides as of table 1. The inventors packaged with a scCMV-EGFP transgene (CMV: cytomegalovirus promoter). Except for two variants (Cap8 and Cap10), all capsids packaged well with titers between $10^{11}$-$10^{12}$ vg/ml. Three weeks following intravitreal injections into adult mice, robust expression primarily in photoreceptors was observed for Cap3, Cap5, Cap7, Cap9, Cap 11, Cap 13 and Cap 14 (Table 1, FIGS. 1-3), but also some expression in cells of the inner retina such as bipolar cells, amacrine cells and Müller cells and very few retinal ganglion cells. In a direct comparison with the performance of AAV2(7m8), which is also an evolved AAV2 variant (Dalkara et al., Sci Transl Med, 2013. 5: p. 189ra76.) and currently considered state-of-the art for intravitreal injections, the inventors' novel variants penetrated significantly better though the retina and transduced significantly more photoreceptors and significantly less ganglion cells (FIG. 1, FIGS. 1-3). The above results were confirmed by packaging the 8 pre-selected variants (Cap3, Cap5, Cap7, Cap9 Cap 11, Cap 13 and Cap 14; Table 1) also with the schEf1a-EGFP-mCitrine transgene (hEf1a: human Ef1a promoter, "strong" native mammalian ubiquitous promoter) and injecting adult mice intravitreally with a matched titer of $1 \times 10^{11}$ vg/ml.

Equivalently, the new variants transduced photoreceptors in significantly larger number than the titer-matched controls AAV2(M6) and AAV(7m8). Consequently, the selected variants appear to possess superior inner limiting membrane and retinal penetration properties compared to AAV2(M6) and AAV2(7m8) and are significantly more effective in transducing the photoreceptors in the outer nuclear layer (ONL) (FIG. 1).

Cap14 packaged with scCMV-EGFP and schEf1a-EGFP and injected at 3E+10 vg/ml performed significantly better than AAV2(7m8) injected at the same low dose (FIGS. 1, 2) and even better than AAV2(7m8) at the minimal dose typically used in mouse of 1E+12 vg/ml. This is promising in light of using lower doses in patients to reduce concerns of toxicity and immune responses.

TABLE 1

Next-generation sequencing of ON-bipolar cell isolated variants from directed evolution revealed a high degree of convergence in viral libraries. The 7mer inserts were flanked by alanine spacers in the form of ~$N_{587}$AAASASEASTAA$R_{588}$~ (SEQ ID NO 29) here exemplified for variant #3.
ON-Bipolar cell dominance: =occurrence [ON-bipolar cells / Non-On-bipolar cells]

| Clone | Variant (Cap) # | ON- bipolar cell fraction | | Non-ON-bipolar cell fraction | | ON-bipolar cell dominance | SEQ ID NO |
| --- | --- | --- | --- | --- | --- | --- | --- |
|  |  | F | O (%) | F | O (%) |  |  |
| HHNDRAP# | 15 | 6050 | 9.9 | 1121 | 5.4 | 1.8 | 18 |
| DGNLHKS# | 2 | 2837 | 4.7 | 1069 | 5.1 | 0.9 | 19 |
| SASEAST* | 3 | 2814 | 4.6 | 1511 | 7.2 | 0.6 | 10 |
| HSDSSKP | 4 | 1583 | 2.6 | 370 | 1.8 | 1.5 | 20 |
| DTRPHDQ | 5 | 1378 | 2.3 | 473 | 2.3 | 1.0 | 11 |
| PNPNCTL | 9 | 403 | 0.7 | 41 | 0.2 | 3.4 | 13 |
| TLTGLCP~ | 8 | 505 | 0.8 | 50 | 0.2 | 3.5 | 21 |
| EHYNSTC | 7 | 310 | 0.5 | 27 | 0.1 | 3.9 | 12 |

TABLE 1-continued

Next-generation sequencing of ON-bipolar cell isolated variants from directed evolution revealed a high degree of convergence in viral libraries. The 7mer inserts were flanked by alanine spacers in the form of ~$N_{587}$AAASASEASTAA $R_{588}$~ (SEQ ID NO 29) here exemplified for variant #3.
ON-Bipolar cell dominance: =occurrence [ON-bipolar cells / Non-On-bipolar cells]

| Clone | Variant (Cap) # | ON- bipolar cell fraction F | O (%) | Non-ON-bipolar cell fraction F | O (%) | ON-bipolar cell dominance | SEQ ID NO |
|---|---|---|---|---|---|---|---|
| NHAPNHC | 6 | 292 | 0.5 | 25 | 1 | 4.0 | 22 |
| DRRPGIC | 1 | 209 | 0.34 | 4 | 0.02 | 17.9 | 23 |
| VDATCMQ~ | 10 | 402 | 0.7 | 40 | 0.2 | 3.4 | 24 |
| TPPSITA* | 11 | 342 | 0.6 | 35 | 0.2 | 3.3 | 14 |
| CGESSYL | 12 | 334 | 0.5 | 37 | 0.2 | 3.1 | 15 |
| PRTPHTA* | 13 | 227 | 0.4 | 27 | 0.1 | 2.9 | 16 |
| ELCDGFA* | 14 | 222 | 0.4 | 38 | 0.2 | 2.0 | 17 |

F = Frequency;
O = Occurrence
[#]appeared in 2nd selection round
*top candidates selected from in vivo screening
~Capsids with inserts Nr. 8 and Nr. 10 did not package Positively Charged
Negatively Charged
All 15 selected clones were ranked in the top 67 of 60'884 peptides sequenced from the isolated ON-bipolar cell fractions of C57BL/6_Opto-mGluR6 mice (van Wyk et al., PLoS Biol, 2015. 13(5): p. e1002143).

TABLE 2

Amino acid sequences of AAV2 capsid protein VP1 with different insertions. VP3 (italicized sequence) overlapping with VP1, tyrosine to phenylalanine (Y-F) mutations are underlined, amino acid numbering refers to the whole VP1 sequence. The highest peak at $G_{453}$ and the second highest peak at N587, where the random 7mers were inserted, are bold and underlined. The insertion is boxed, including the alanine linkers.
SI: SEQ ID NO of the peptide insertion sequence; FS: SEQ ID NO of the full capsid sequence

| SI | Insertion | FS | Sequence |
|---|---|---|---|
| — | AAV2 (Y252, 272, 444, 500, 700, 730F) | 1 | MAADGYLPDWLEDTLSEGIRQWWKLKPGPPPPKPAERHKDDSR GLVLPGYKYLGPFNGLDKGEPVNEADAAALEHDKAYDROLDSG DNPYLKYNHADAEFQERLKEDTSFGGNLGRAVFQAKKRVLEPL GLVEEPVKTAPGKKRPVEHSPVEPDSSSGTGKAGQQPARKRLN FGQTGDADSVPDPQPLGQPPAAPSGLGTNTMATGSGAPMADNN EGADGVGNSSGNWHCDSTWMGDRVITTSTRTWALPTFNNHLYK QISSQSGASNDNHFFGYSTPWGYFDFNRFHCHFSPRDWORLIN NNWGFRPKRLNFKLFNIQVKEVTQNDGTTTIANNLTSTVQVET DSEYQLPYVLGSAHQGCLPPFPADVFMVPQYGYLTLNNGSQAV GRSSFYCLEYFPSQMLRTGNNFTFSYTFEDVPFHSSYAHSQSL DRLMNPLIDQYLYFLSRTNTPSGTTTQSRLOFSQAGASDIRDQ SRNWLPGPCYRQQRVSKTSADNNNSEFSWTGATKYHLNGRDSL VNPGPAMASHKDDEEKFFPQSGVLIFGKQGSEKTNVDIEKVMI TDEEEIRTTNPVATEQYGSVSTNLQRGNRQAATADVNTQGVLP GMVWQDRDVYLQGPIWAKIPHTDGHFHPSPLMGGFGLKHPPPQ ILIKNTPVPANPSTTFSAAKFASFITQYSTGQVSVEIEWELQK ENSKRWNPEIQFTSNYNKSVNVDFTVDINGVYSEPRPIGTRF LTRNL |
| 10 | SASEAST | 2 | MAADGYLPDWLEDTLSEGIRQWWKLKPGPPPPKPAERHKDDSR GLVLPGYKYLGPFNGLDKGEPVNEADAAALEHDKAYDRQLDSG DNPYLKYNHADAEFQERLKEDTSFGGNLGRAVFQAKKRVLEPL GLVEEPVKTAPGKKRPVEHSPVEPDSSSGTGKAGQQPARKRLN FGQTGDADSVPDPQPLGQPPAAPSGLGTNTMATGSGAPMADNN EGADGVGNSSGNWHCDSTWMGDRVITTSTRTWALPTFNNHLYK QISSQSGASNDNHFFGYSTPWGYFDFNRFHCHFSPRDWORLIN NNWGFRPKRLNFKLFNIQVKEVTQNDGTTTIANNLTSTVQVFT DSEYQLPYVLGSAHQGCLPPFPADVFMVPQYGYLTLNNGSQAV GRSSFYCLEYFPSQMLRTGNNFTFSYTFEDVPFHSSYAHSQSL DRLMNPLIDQYLYFLSRTNTPSGTTTQSRLQFSQAGASDIRDQ SRNWLPGPCYRQQRVSKTSADNNNSEFSWTGATKYHLNGRDSL VNPGPAMASHKDDEEKFFPQSGVLIFGKQGSEKTNVDIEKVMI TDEEEIRTTNPVATEQYGSVSTNLQRGNAASSASEASTAARQAA TADVNTQGVLPGMVWQDRDVYLQGPIWAKIPHTDGHFHPSPLM |

TABLE 2-continued

Amino acid sequences of AAV2 capsid protein VP1 with different insertions.
VP3 (italicized sequence) overlapping with VP1, tyrosine to phenylalanine (Y-F) mutations
are underlined, amino acid numbering refers to the whole VP1 sequence. The highest peak
at $G_{453}$ and the second highest peak at N587, where the random 7mers were inserted, are
bold and underlined. The insertion is boxed, including the alanine linkers.
SI: SEQ ID NO of the peptide insertion sequence; FS: SEQ ID NO of the full capsid
sequence

| SI | Insertion | FS | Sequence |
|---|---|---|---|
| 11 | DTRPHDQ | 3 | GGFGLKHPPPQILIKNTPVPANPSTTFSAAKFASFITQYSTGQ<br>VSVEIEWELQKENSKRWNPEIQFTSNYNKSVNVDFTVDINGVY<br>SEPRPIGTRFLTRNL<br>MAADGYLPDWLEDTLSEGIRQWWKLKPGPPPPKPAERHKDDSR<br>GLVLPGYKYLGPFNGLDKGEPVNEADAAALEHDKAYDRQLDSG<br>DNPYLKYNHADAEFQERLKEDTSFGGNLGRAVFQAKKRVLEPL<br>GLVEEPVKTAPGKKRPVEHSPVEPDSSSGTGKAGQQPARKRLN<br>FGQTGDADSVPDPQPLGQPPAAPSGLGTNTMATGSGAPMADNN<br>EGADGVGNSSGNWHCDSTWMGDRVITTSTRTWALPTFNNHLYK<br>QISSQSGASNDNHFFGYSTPWGYFDFNRFHCHFSPRDWQRLIN<br>NNWGFRPKRLNFKLFNIQVKEVTQNDGTTTIANNLTSTVQVFT<br>DSEYQLPYVLGSAHQGCLPPFPADVFMVPQYGYLTLNNGSQAV<br>GRSSFYCLEYFPSQMLRTGNNFTFSYTFEDVPFHSSYAHSQSL<br>DRLMNPLIDQYLYFLSRTNTPSGTTTQSRLQFSQAGASDIRDQ<br>SRNWLPGPCYRQQRVSKTSADNNNSEFSWTGATKYHLNGRDSL<br>VNPGPAMASHKDDEEKFFPQSGVLIFGKQGSEKTNVDIEKVMI<br>TDEEEIRTTNPVATEQYGSVSTNLQRGNAA⌐DTRPHDQ⌐AARQAA |
| 12 | EHYNSTC | 4 | TADVNTQGVLPGMVWQDRDVYLQGPIWAKIPHTDGHFHPSPLM<br>GGFGLKHPPPQILIKNTPVPANPSTTFSAAKFASFITQYSTGQ<br>VSVEIEWELQKENSKRWNPEIQFTSNYNKSVNVDFTVDINGVY<br>SEPRPIGTRFLTRNL<br>MAADGYLPDWLEDTLSEGIRQWWKLKPGPPPPKPAERHKDDSR<br>GLVLPGYKYLGPFNGLDKGEPVNEADAAALEHDKAYDRQLDSG<br>DNPYLKYNHADAEFQERLKEDTSFGGNLGRAVFQAKKRVLEPL<br>GLVEEPVKTAPGKKRPVEHSPVEPDSSSGTGKAGQQPARKRLN<br>FGQTGDADSVPDPQPLGQPPAAPSGLGTNTMATGSGAPMADNN<br>EGADGVGNSSGNWHCDSTWMGDRVITTSTRTWALPTFNNHLYK<br>QISSQSGASNDNHFFGYSTPWGYFDENRFHCHFSPRDWQRLIN<br>NNWGFRPKRLNFKLFNIQVKEVTQNDGTTTIANNLTSTVQVFT<br>DSEYQLPYVLGSAHQGCLPPFPADVFMVPQYGYLTLNNGSQAV<br>GRSSFYCLEYFPSQMLRTGNNFTFSYTFEDVPFHSSYAHSQSL<br>DRLMNPLIDQYLYFLSRTNTPSGTTTQSRLQFSQAGASDIRDQ<br>SRNWLPGPCYRQQRVSKTSADNNNSEFSWTGATKYHLNGRDSL<br>VNPGPAMASHKDDEEKFFPQSGVLIFGKQGSEKTNVDIEKVMI<br>TDEEEIRTTNPVATEQYGSVSTNLQRGNAA⌐EHYNSTC⌐AARQAA |
| 13 | PNPNCTL | 5 | TADVNTQGVLPGMVWQDRDVYLQGPIWAKIPHTDGHFHPSPLM<br>GGFGLKHPPPQILIKNTPVPANPSTTFSAAKFASFITQYSTGQ<br>VSVEIEWELQKENSKRWNPEIQFTSNYNKSVNVDFTVDINGVY<br>SEPRPIGTRFLTRNL<br>MAADGYLPDWLEDTLSEGIRQWWKLKPGPPPPKPAERHKDDSR<br>GLVLPGYKYLGPENGLDKGEPVNEADAAALEHDKAYDRQLDSG<br>DNPYLKYNHADAEFQERLKEDTSFGGNLGRAVFQAKKRVLEPL<br>GLVEEPVKTAPGKKRPVEHSPVEPDSSSGTGKAGQQPARKRLN<br>FGQTGDADSVPDPQPLGQPPAAPSGLGTNTMATGSGAPMADNN<br>EGADGVGNSSGNWHCDSTWMGDRVITTSTRTWALPTFNNHLYK<br>QISSQSGASNDNHFFGYSTPWGYFDENRFHCHFSPRDWQRLIN<br>NNWGFRPKRLNFKLFNIQVKEVTQNDGTTTIANNLTSTVQVFT<br>DSEYQLPYVLGSAHQGCLPPFPADVFMVPQYGYLTLNNGSQAV<br>GRSSFYCLEYFPSQMLRTGNNFTFSYTFEDVPFHSSYAHSQSL<br>DRLMNPLIDQYLYFLSRTNTPSGTTTQSRLQFSQAGASDIRDQ<br>SRNWLPGPCYRQQRVSKTSADNNNSEFSWTGATKYHLNGRDSL<br>VNPGPAMASHKDDEEKFFPQSGVLIFGKQGSEKTNVDIEKVMI<br>TDEEEIRTTNPVATEQYGSVSTNLQRGNAA⌐PNPNCTL⌐AARQAA |
| 14 | TPPSITA | 6 | TADVNTQGVLPGMVWQDRDVYLQGPIWAKIPHTDGHFHPSPLM<br>GGFGLKHPPPQILIKNTPVPANPSTTFSAAKFASFITQYSTGQ<br>VSVEIEWELQKENSKRWNPEIQFTSNYNKSVNVDFTVDINGVY<br>SEPRPIGTRFLTRNL<br>MAADGYLPDWLEDTLSEGIRQWWKLKPGPPPPKPAERHKDDSR<br>GLVLPGYKYLGPENGLDKGEPVNEADAAALEHDKAYDRQLDSG<br>DNPYLKYNHADAEFQERLKEDTSFGGNLGRAVFQAKKRVLEPL<br>GLVEEPVKTAPGKKRPVEHSPVEPDSSSGTGKAGQQPARKRLN<br>FGQTGDADSVPDPQPLGQPPAAPSGLGTNTMATGSGAPMADNN<br>EGADGVGNSSGNWHCDSTWMGDRVITTSTRTWALPTFNNHLYK<br>QISSQSGASNDNHFFGYSTPWGYFDFNRFHCHFSPRDWQRLIN<br>NNWGFRPKRLNFKLFNIQVKEVTQNDGTTTIANNLTSTVQVFT<br>DSEYQLPYVLGSAHQGCLPPFPADVFMVPQYGYLTLNNGSQAV<br>GRSSFYCLEYFPSQMLRTGNNFTFSYTFEDVPFHSSYAHSQSL |

TABLE 2-continued

Amino acid sequences of AAV2 capsid protein VP1 with different insertions.
VP3 (italicized sequence) overlapping with VP1, tyrosine to phenylalanine (Y-F) mutations
are underlined, amino acid numbering refers to the whole VP1 sequence. The highest peak
at $G_{453}$ and the second highest peak at N587, where the random 7mers were inserted, are
bold and underlined. The insertion is boxed, including the alanine linkers.
SI: SEQ ID NO of the peptide insertion sequence; FS: SEQ ID NO of the full capsid
sequence

| SI | Insertion | FS | Sequence |
|----|-----------|----|----------|
|    |           |    | *DRLMNPLIDQYLYFLSRTNTPSGTTTQSRLQFSQAGASDIRDQ*<br>*SRNWLPGPCYRQQRVSKTSADNNNSEFSWTGATKYHLNGRDSL*<br>*VNPGPAMASHKDDEEKFFPQSGVLIFGKQGSEKTNVDIEKVMI*<br>*TDEEEIRTTNPVATEQYGSVSTNLQRGNAA*<u>ATPPSITA</u>*AARQAA* |
|    |           |    | *TADVNTQGVLPGMVWQDRDVYLQGPIWAKIPHTDGHFHPSPLM*<br>*GGFGLKHPPPQILIKNTPVPANPSTTFSAAKFASFITQYSTGQ*<br>*VSVEIEWELQKENSKRWNPEIQFTSNYNKSVNVDFTVDTNGVY*<br>*SEPRPIGTRFLTRNL* |
| 15 | CGESSYL   | 7  | MAADGYLPDWLEDTLSEGIRQWWKLKPGPPPPKPAERHKDDSR<br>GLVLPGYKYLGPFNGLDKGEPVNEADAAALEHDKAYDRQLDSG<br>DNPYLKYNHADAEFQERLKEDTSFGGNLGRAVFQAKKRVLEPL<br>GLVEEPVKTAPGKKRPVEHSPVEPDSSSGTGKAGQQPARKRLN<br>FGQTGDADSVPDPQPLGQPPAAPSGLGTNTMATGSGAPMADNN<br>*EGADGVGNSSGNWHCDSTWMGDRVITTSTRTWALPTFNNHLYK*<br>*QISSQSGASNDNHFFGYSTPWGYFDFNRFHCHFSPRDWQRLIN*<br>*NNWGFRPKRLNFKLFNIQVKEVTQNDGTTTIANNLTSTVQVFT*<br>*DSEYQLPYVLGSAHQGCLPPFPADVFMVPQYGYLTLNNGSQAV*<br>*GRSSFYCLEYFPSQMLRTGNNFTFSYTFEDVPFHSSYAHSQSL*<br>*DRLMNPLIDQYLYFLSRTNTPSGTTTQSRLQFSQAGASDIRDQ*<br>*SRNWLPGPCYRQQRVSKTSADNNNSEFSWTGATKYHLNGRDSL*<br>*VNPGPAMASHKDDEEKFFPQSGVLIFGKQGSEKTNVDIEKVMI*<br>*TDEEEIRTTNPVATEQYGSVSTNLQRGNAA*<u>ACGESSYLAARQA</u>*A* |
|    |           |    | *TADVNTQGVLPGMVWQDRDVYLQGPIWAKIPHTDGHFHPSPLM*<br>*GGFGLKHPPPQILIKNTPVPANPSTTFSAAKFASFITQYSTGQ*<br>*VSVEIEWELQKENSKRWNPEIQFTSNYNKSVNVDFTVDTNGVY*<br>*SEPRPIGTRFLTRNL* |
| 16 | PRTPHTA   | 8  | MAADGYLPDWLEDTLSEGIRQWWKLKPGPPPPKPAERHKDDSR<br>GLVLPGYKYLGPFNGLDKGEPVNEADAAALEHDKAYDRQLDSG<br>DNPYLKYNHADAEFQERLKEDTSFGGNLGRAVFQAKKRVLEPL<br>GLVEEPVKTAPGKKRPVEHSPVEPDSSSGTGKAGQQPARKRLN<br>FGQTGDADSVPDPQPLGQPPAAPSGLGTNTMATGSGAPMADNN<br>*EGADGVGNSSGNWHCDSTWMGDRVITTSTRTWALPTFNNHLYK*<br>*QISSQSGASNDNHFFGYSTPWGYFDFNRFHCHFSPRDWQRLIN*<br>*NNWGFRPKRLNFKLFNIQVKEVTQNDGTTTIANNLTSTVQVFT*<br>*DSEYQLPYVLGSAHQGCLPPFPADVFMVPQYGYLTLNNGSQAV*<br>*GRSSFYCLEYFPSQMLRTGNNFTFSYTFEDVPFHSSYAHSQSL*<br>*DRLMNPLIDQYLYFLSRTNTPSGTTTQSRLQFSQAGASDIRDQ*<br>*SRNWLPGPCYRQQRVSKTSADNNNSEFSWTGATKYHLNGRDSL*<br>*VNPGPAMASHKDDEEKFFPQSGVLIFGKQGSEKTNVDIEKVMI*<br>*TDEEEIRTTNPVATEQYGSVSTNLQRGNAA*<u>APRTPHTAAARQA</u>*A* |
|    |           |    | *TADVNTQGVLPGMVWQDRDVYLQGPIWAKIPHTDGHFHPSPLM*<br>*GGFGLKHPPPQILIKNTPVPANPSTTFSAAKFASFITQYSTGQ*<br>*VSVEIEWELQKENSKRWNPEIQFTSNYNKSVNVDFTVDINGVY*<br>*SEPRPIGTRFLTRNL* |
| 17 | ELCDGFA   | 9  | MAADGYLPDWLEDTLSEGIRQWWKLKPGPPPPKPAERHKDDSR<br>GLVLPGYKYLGPFNGLDKGEPVNEADAAALEHDKAYDRQLDSG<br>DNPYLKYNHADAEFQERLKEDTSFGGNLGRAVFQAKKRVLEPL<br>GLVEEPVKTAPGKKRPVEHSPVEPDSSSGTGKAGQQPARKRLN<br>FGQTGDADSVPDPQPLGQPPAAPSGLGTNTMATGSGAPMADNN<br>*EGADGVGNSSGNWHCDSTWMGDRVITTSTRTWALPTFNNHLYK*<br>*QISSQSGASNDNHFFGYSTPWGYFDENRFHCHFSPRDWQRLIN*<br>*NNWGFRPKRLNFKLFNIQVKEVTQNDGTTTIANNLTSTVQVFT*<br>*DSEYQLPYVLGSAHQGCLPPFPADVFMVPQYGYLTLNNGSQAV*<br>*GRSSFYCLEYFPSQMLRTGNNFTFSYTFEDVPFHSSYAHSQSL*<br>*DRLMNPLIDQYLYFLSRTNTPSGTTTQSRLQFSQAGASDIRDQ*<br>*SRNWLPGPCYRQQRVSKTSADNNNSEFSWTGATKYHLNGRDSL*<br>*VNPGPAMASHKDDEEKFFPQSGVLIFGKQGSEKTNVDIEKVMI*<br>*TDEEEIRTTNPVATEQYGSVSTNLQRGNAA*<u>AELCDGFAAARQA</u>*A* |
|    |           |    | *TADVNTQGVLPGMVWQDRDVYLQGPIWAKIPHTDGHFHPSPLM*<br>*GGFGLKHPPPQILIKNTPVPANPSTTFSAAKFASFITQYSTGQ*<br>*VSVEIEWELQKENSKRWNPEIQFTSNYNKSVNVDFTVDINGVY*<br>*SEPRPIGTRFLTRNL* |

TABLE 3

Homologous positions of potential oligomer insertion sites and Y-F and T-V point mutation sites, respectively, on the capsid proteins of VP3 in different AAV serotypes.

| Position | AAV1 | AAV2 | AAV5 | AAV6 | AAV7 | AAV8 | AAV9 | AAV Rh10 | AAV Anc80 |
|---|---|---|---|---|---|---|---|---|---|
| #1 | G454 | G453 | G446 | G454 | G456 | G456 | G455 | G456 | G454 |
| #2 | P591 | R588 | S576 | P591 | T590 | T591 | A589 | A591 | T589 |
| #3 | Y252 | Y252 | Y242 | Y252 | Y253 | Y253 | Y252 | Y253 | Y252 |
| #4 | Y273 | Y272 | Y263 | Y273 | Y274 | Y275 | Y274 | Y275 | Y273 |
| #5 | Y445 | Y444 | R437 | Y445 | Y446 | Y447 | Y446 | Y447 | Y445 |
| #6 | F501 | Y500 | S487 | F501 | F503 | F503 | F501 | F503 | F501 |
| #7 | Y701 | Y700 | Y689 | Y701 | Y702 | Y703 | Y701 | Y703 | Y701 |
| #8 | Y705 | Y704 | Y693 | Y705 | F706 | Y707 | Y705 | Y707 | Y705 |
| #9 | Y731 | Y730 | Y719 | Y731 | Y732 | Y733 | Y731 | Y733 | Y731 |
| #10 | T492 | T491 | G478 | T492 | T494 | T494 | T492 | T494 | T492 |

Underlined positions exhibit different amino acids with respect to AAV2.

TABLE 4

Capsid gene sequence (VP1) of adeno-associated virus 2 (Y252, 272, 444, 500, 700, 730F), referred to as AAV2(M6)

| SEQ ID NO | Sequence |
|---|---|
| 27 | ATGGCTGCCGATGGTTATCTTCCAGATTGGCTCGAGGACACTCTCT<br>CTGAAGGAATAAGACAGTGGTGGAAGCTCAAACCTGGCCCACCACC<br>ACCAAAGCCCGCAGAGCGGCATAAGGACGACAGCAGGGGTCTTGTG<br>CTTCCTGGGTACAAGTACCTCGGACCCTTCAACGGACTCGACAAGG<br>GAGAGCCGGTCAACGAGGCAGACGCCGCGGCCCTCGAGCACGACAA<br>AGCCTACGACCGGCAGCTCGACAGCGGAGACAACCCGTACCTCAAG<br>TACAACCACGCCGACGCGGAGTTTCAGGAGCGCCTTAAAGAAGATA<br>CGTCTTTTGGGGGCAACCTCGGACGAGCAGTCTTCCAGGCGAAAAA<br>GAGGGTTCTTGAACCTCTGGGCTGGTTGAGGAACCTGTTAAGACG<br>GCTCCGGGAAAAAGAGGCCGGTAGAGCACTCTCCTGTGGAGCCAG<br>ACTCCTCCTCGGGAACCGGAAAGGCGGGCCAGCAGCCTGCAAGAAA<br>AAGATTGAATTTTGGTCAGACTGGAGACGCAGACTCAGTACCTGAC<br>CCCCAGCCTCCGGACAGCCACCAGCAGCCCCCTCTGGTCTGGGAA<br>CTAATACG<br>ATGGCTACAGGCAGTGGCGCACCAATGGCAG<br>ACAATAACGAGGGCGCCGACGGAGTGGGTAA<br>TTCCTCCGGAAATTGGCATTGCGATTCCACA<br>TGGATGGGCGACAGAGTCATCACCACCAGCA<br>CCCGAACCTGGGCCCTGCCCACCTTCAACAA<br>CCACCTGTACAAACAAATTTCCAGCCAATCA<br>GGAGCTTCGAACGACAATCACTTCTTTGGCT<br>ACAGCACCCCTTGGGGGTATTTTGACTTCAA<br>CAGATTCCACTGCCACTTTTCACCACGTGAC<br>TGGCAAAGACTCATCAACAACAACTGGGGAT<br>TCCGACCCAAGAGACTCAACTTCAAGCTCTT<br>TAACATTCAAGTCAAAGAGGTCACGCAGAAT<br>GACGGTACGACGACGATTGCCAATAACCTTA<br>CCAGCACGGTTCAGGTGTTTACTGACTCGGA<br>GTACCAGCTCCCGTACGTCCTCGGCTCGGCG<br>CATCAAGGATGCCTCCCGCCGTTCCCAGCAG<br>ACGTCTTCATGGTGCCACAGTATGGATACCT<br>CACCCTGAACAACGGGAGTCAGGCAGTAGGA<br>CGCTCTTCATTTTACTGCCTGGAGTACTTTC<br>CTTCTCAGATGCTGCGTACCGGGAAACAACTT<br>TACCTTCAGCTACACTTTTGAGGACGTTCCT<br>TTCCACAGCAGCTACGCTCACAGCCAGAGTC<br>TGGACCGTCTCATGAATCCTCTCATCGACCA<br>GTACCTGTATTTCTTAAGCAGAACAAACACT<br>CCAAGTGGAACCACCACGCAGTCAAGGCTTC<br>AGTTTTCTCAGGCCGGAGCGAGTGACATTCG<br>GGACCAGTCTAGGAACTGGCTTCCTGGACCC<br>TGTTACCGCCAGCAGCGAGTATCAAAGACAT<br>CTGCGGATAACAACAACAGTGAATTCTCGTG<br>GACCGGTGCTACCAAGTACCACCTCAATGGC<br>AGAGACTCTCTGGTGAATCCGGGCCCGGCCA<br>TGGCAAGCCACAAGGACGATGAAGAAAAGTT<br>TTTTCCTCAGAGCGGGGTTCTCATCTTTGGG<br>AAGCAAGGCTCAGAGAAAACAAATGTGGACA<br>TTGAAAAGGTCATGATTACAGACGAAGAGGA<br>AATCAGGACAACCAATCCCGTGGCTACGGAG<br>CAGTATGGTTCTGTATCTACCAACCTCCAGA<br>GAGGCAACAGACAAGCAGCTACCGCAGATGT<br>CAACACACAAGGCGTTCTTCCAGGCATGGTC<br>TGGCAGGACAGAGATGTGTACCTTCAGGGGC<br>CCATCTGGGCAAAGATTCCACACACGGACGG<br>ACATTTTCACCCCTCTCCCCTCATGGGTGGA<br>TTCGGACTTAAACACCCTCCTCCACAGATTC<br>TCATCAAGAACACCCCGGTACCTGCGAATCC<br>TTTCGACCACCTTCAGTGCGGCAAAGTTTGCT<br>TCCTTCATCACACAGTACTCCACGGGACAGG<br>TCAGCGTGGAGATCGAGTGGGAGCTGCAGAA<br>GGAAAACAGCAAACGCTGGAATCCCGAAATT<br>CAGTTCACTTCGAACTACAACAAGTCTGTTA<br>ATGTGGACTTTACTGTGGACACTAATGGCGT<br>GTATTCAGAGCCTCGCCCCATTGGTACCAGA<br>TTCCTGACTCGTAATCTGTAA |

Based on the AAV 2 complete genome sequence, GenBank accession number J01901.1

The Cap gene of the library consists of VP3 (bold sequence), tyrosine to phenylalanine (Y-F) mutations are underlined, base pair numbering refers to the whole VP1 sequence.

The invention claimed is:

1. An adeno-associated virus (AAV) capsid polypeptide comprising a peptide insert in the C-terminal direction at position 453 or in the C-terminal direction at position 587, 588, 589, 590, 591 or 592 of the AAV serotype 2 capsid having amino acid sequence of SEQ ID NO: 1 or a position homologous thereto in an AAV of another serotype, wherein the peptide insert is selected from:

SASEAST, (Cap3; SEQ ID NO: 10)

DTRPHDQ, (Cap5; SEQ ID NO: 11)

EHYNSTC, (Cap7; SEQ ID NO: 12)

PNPNCTL, (Cap9; SEQ ID NO: 13)

TPPSITA, (Cap11; SEQ ID NO: 14)

CGESSYL, (Cap12; SEQ ID NO: 15)

PRTPHTA and (Cap13; SEQ ID NO: 16)

ELCDGFA. (Cap14; SEQ ID NO: 17)

2. The AAV capsid polypeptide of claim 1, wherein the insert is at position 587, 588, 589, 590, 591 or 592 of the AAV serotype 2 capsid or a position homologous thereto in an AAV of another serotype.

3. The AAV capsid polypeptide of claim 2, wherein the insert is at position 587 of the AAV serotype 2 capsid or a position homologous thereto in an AAV of another serotype.

4. The AAV capsid polypeptide of claim 1, wherein the insert is selected from

SASEAST, (Cap3; SEQ ID NO: 10)

TPPSITA, (Cap11; SEQ ID NO: 14)

PRTPHTA and (Cap13; SEQ ID NO: 16)

ELCDGFA. (Cap14; SEQ ID NO: 17)

5. The AAV capsid polypeptide of claim 1, wherein the polypeptide comprises an insert in the C-terminal direction at position 587.

6. The adeno-associated virus capsid polypeptide of claim 1, wherein the AAV capsid protein is an AAV2 capsid comprising:
   a. one or more tyrosine to phenylalanine substitutions at positions 252, 272, 444, 500, 700, 704 and 730, and/or
   b. one or more threonine to valine substitutions.

7. The AAV capsid polypeptide of claim 6, wherein the one or more tyrosine to phenylalanine substitutions are at positions 252, 272, 444, 500, 704 and 730.

8. The AAV capsid polypeptide of claim 6, wherein the one or more tyrosine to phenylalanine substitutions are at all of the positions 252, 272, 444, 500, 700 and 730.

9. The AAV capsid polypeptide of claim 6, wherein the one or more threonine to valine substitutions is T491V.

10. A nucleic acid sequence encoding the AAV capsid polypeptide according to claim 1.

11. The nucleic acid sequence of claim 10, wherein the sequence is a self-complementary or single stranded vector genome.

12. The nucleic acid sequence of claim 11, wherein the sequence is a self-complementary vector genome.

13. The nucleic acid sequence of claim 10 or claim 11, wherein the nucleic acid sequence comprises a transgene, wherein the transgene encodes a light-sensitive protein, a siRNA, a shRNA or a CRISPR/Cas-gRNA cassette.

14. The nucleic acid sequence of claim 13, wherein the transgene is under control of a promoter sequence operable in a mammalian cell.

15. The nucleic acid sequence of claim 14, wherein the mammalian cell is a retinal cell.

16. The nucleic acid sequence of claim 15, wherein the retinal cell is a human retinal cell.

17. The nucleic acid sequence of claim 14, wherein the promoter is a ubiquitous or cell-specific promoter.

18. The nucleic acid sequence of claim 14, wherein the promoter is selected from a CMV immediate early promoter, or hEfla promoter.

19. A method of treating a condition in a subject in need thereof, comprising administering the AAV capsid polypeptide of claim 1, wherein the condition affects a retinal or retinal pigment epithelium cell, a photoreceptor, a bipolar cell, a ganglion cell, and/or an amacrine cell.

20. The method of claim 19, wherein the AAV capsid polypeptide is administered by intravitreal administration or by subretinal administration.

21. The method of claim 19, wherein the intravitreal administration is intravitreal injection.

* * * * *

SEQUENCE LISTING

<160> NUMBER OF SEQ ID NOS: 28

<210> SEQ ID NO 1
<211> LENGTH: 735
<212> TYPE: PRT
<213> ORGANISM: Artificial Sequence -continued
<220> FEATURE:
<223> OTHER INFORMATION: AAV2 capsid protein VP1 with different mutations

<400> SEQUENCE: 1

Met Ala Ala Asp Gly Tyr Leu Pro Asp Trp Leu Glu Asp Thr Leu Ser
1               5                   10                  15

Glu Gly Ile Arg Gln Trp Trp Lys Leu Lys Pro Gly Pro Pro Pro Pro
            20                  25                  30

Lys Pro Ala Glu Arg His Lys Asp Asp Ser Arg Gly Leu Val Leu Pro
        35                  40                  45

Gly Tyr Lys Tyr Leu Gly Pro Phe Asn Gly Leu Asp Lys Gly Glu Pro
    50                  55                  60

Val Asn Glu Ala Asp Ala Ala Leu Glu His Asp Lys Ala Tyr Asp
65              70                  75                  80

Arg Gln Leu Asp Ser Gly Asp Asn Pro Tyr Leu Lys Tyr Asn His Ala
            85                  90                  95

Asp Ala Glu Phe Gln Glu Arg Leu Lys Glu Asp Thr Ser Phe Gly Gly
        100                 105                 110

Asn Leu Gly Arg Ala Val Phe Gln Ala Lys Lys Arg Val Leu Glu Pro
    115                 120                 125

Leu Gly Leu Val Glu Glu Pro Val Lys Thr Ala Pro Gly Lys Lys Arg
130                 135                 140

Pro Val Glu His Ser Pro Val Glu Pro Asp Ser Ser Ser Gly Thr Gly
145                 150                 155                 160

Lys Ala Gly Gln Gln Pro Ala Arg Lys Arg Leu Asn Phe Gly Gln Thr
            165                 170                 175

Gly Asp Ala Asp Ser Val Pro Asp Pro Gln Pro Leu Gly Gln Pro Pro
        180                 185                 190

Ala Ala Pro Ser Gly Leu Gly Thr Asn Thr Met Ala Thr Gly Ser Gly
    195                 200                 205

Ala Pro Met Ala Asp Asn Asn Glu Gly Ala Asp Gly Val Gly Asn Ser
210                 215                 220

Ser Gly Asn Trp His Cys Asp Ser Thr Trp Met Gly Asp Arg Val Ile
225                 230                 235                 240

Thr Thr Ser Thr Arg Thr Trp Ala Leu Pro Thr Phe Asn Asn His Leu
            245                 250                 255

Tyr Lys Gln Ile Ser Ser Gln Ser Gly Ala Ser Asn Asp Asn His Phe
        260                 265                 270

Phe Gly Tyr Ser Thr Pro Trp Gly Tyr Phe Asp Phe Asn Arg Phe His
    275                 280                 285

Cys His Phe Ser Pro Arg Asp Trp Gln Arg Leu Ile Asn Asn Asn Trp
290                 295                 300

Gly Phe Arg Pro Lys Arg Leu Asn Phe Lys Leu Phe Asn Ile Gln Val
305                 310                 315                 320

Lys Glu Val Thr Gln Asn Asp Gly Thr Thr Thr Ile Ala Asn Asn Leu
            325                 330                 335

Thr Ser Thr Val Gln Val Phe Thr Asp Ser Glu Tyr Gln Leu Pro Tyr
        340                 345                 350

Val Leu Gly Ser Ala His Gln Gly Cys Leu Pro Pro Phe Pro Ala Asp
    355                 360                 365

Val Phe Met Val Pro Gln Tyr Gly Tyr Leu Thr Leu Asn Asn Gly Ser
370                 375                 380

Gln Ala Val Gly Arg Ser Ser Phe Tyr Cys Leu Glu Tyr Phe Pro Ser

```
                385                 390                 395                 400
        Gln Met Leu Arg Thr Gly Asn Asn Phe Thr Phe Ser Tyr Thr Phe Glu
                        405                 410                 415

Asp Val Pro Phe His Ser Ser Tyr Ala His Ser Gln Ser Leu Asp Arg
                        420                 425                 430

Leu Met Asn Pro Leu Ile Asp Gln Tyr Leu Tyr Phe Leu Ser Arg Thr
                        435                 440                 445

Asn Thr Pro Ser Gly Thr Thr Thr Gln Ser Arg Leu Gln Phe Ser Gln
                450                 455                 460

Ala Gly Ala Ser Asp Ile Arg Asp Gln Ser Arg Asn Trp Leu Pro Gly
        465                 470                 475                 480

Pro Cys Tyr Arg Gln Gln Arg Val Ser Lys Thr Ser Ala Asp Asn Asn
                        485                 490                 495

Asn Ser Glu Phe Ser Trp Thr Gly Ala Thr Lys Tyr His Leu Asn Gly
                        500                 505                 510

Arg Asp Ser Leu Val Asn Pro Gly Pro Ala Met Ala Ser His Lys Asp
                        515                 520                 525

Asp Glu Glu Lys Phe Phe Pro Gln Ser Gly Val Leu Ile Phe Gly Lys
                530                 535                 540

Gln Gly Ser Glu Lys Thr Asn Val Asp Ile Glu Lys Val Met Ile Thr
        545                 550                 555                 560

Asp Glu Glu Glu Ile Arg Thr Thr Asn Pro Val Ala Thr Glu Gln Tyr
                        565                 570                 575

Gly Ser Val Ser Thr Asn Leu Gln Arg Gly Asn Arg Gln Ala Ala Thr
                        580                 585                 590

Ala Asp Val Asn Thr Gln Gly Val Leu Pro Gly Met Val Trp Gln Asp
                        595                 600                 605

Arg Asp Val Tyr Leu Gln Gly Pro Ile Trp Ala Lys Ile Pro His Thr
                        610                 615                 620

Asp Gly His Phe His Pro Ser Pro Leu Met Gly Gly Phe Gly Leu Lys
        625                 630                 635                 640

His Pro Pro Pro Gln Ile Leu Ile Lys Asn Thr Pro Val Pro Ala Asn
                        645                 650                 655

Pro Ser Thr Thr Phe Ser Ala Ala Lys Phe Ala Ser Phe Ile Thr Gln
                        660                 665                 670

Tyr Ser Thr Gly Gln Val Ser Val Glu Ile Glu Trp Glu Leu Gln Lys
                        675                 680                 685

Glu Asn Ser Lys Arg Trp Asn Pro Glu Ile Gln Phe Thr Ser Asn Tyr
                690                 695                 700

Asn Lys Ser Val Asn Val Asp Phe Thr Val Asp Thr Asn Gly Val Tyr
        705                 710                 715                 720

Ser Glu Pro Arg Pro Ile Gly Thr Arg Phe Leu Thr Arg Asn Leu
                        725                 730                 735

<210> SEQ ID NO 2
<211> LENGTH: 747
<212> TYPE: PRT
<213> ORGANISM: Artificial Sequence
<220> FEATURE:
<223> OTHER INFORMATION: AAV2 capsid protein VP1 with insertion

<400> SEQUENCE: 2

Met Ala Ala Asp Gly Tyr Leu Pro Asp Trp Leu Glu Asp Thr Leu Ser
1               5                   10                  15

Glu Gly Ile Arg Gln Trp Trp Lys Leu Lys Pro Gly Pro Pro Pro Pro
```

```
            20                  25                  30
Lys Pro Ala Glu Arg His Lys Asp Asp Ser Arg Gly Leu Val Leu Pro
        35                  40                  45
Gly Tyr Lys Tyr Leu Gly Pro Phe Asn Gly Leu Asp Lys Gly Glu Pro
    50                  55                  60
Val Asn Glu Ala Asp Ala Ala Leu Glu His Asp Lys Ala Tyr Asp
 65                  70                  75                  80
Arg Gln Leu Asp Ser Gly Asp Asn Pro Tyr Leu Lys Tyr Asn His Ala
                85                  90                  95
Asp Ala Glu Phe Gln Glu Arg Leu Lys Glu Asp Thr Ser Phe Gly Gly
            100                 105                 110
Asn Leu Gly Arg Ala Val Phe Gln Ala Lys Lys Arg Val Leu Glu Pro
        115                 120                 125
Leu Gly Leu Val Glu Glu Pro Val Lys Thr Ala Pro Gly Lys Lys Arg
    130                 135                 140
Pro Val Glu His Ser Pro Val Glu Pro Asp Ser Ser Ser Gly Thr Gly
145                 150                 155                 160
Lys Ala Gly Gln Gln Pro Ala Arg Lys Arg Leu Asn Phe Gly Gln Thr
                165                 170                 175
Gly Asp Ala Asp Ser Val Pro Asp Pro Gln Pro Leu Gly Gln Pro Pro
            180                 185                 190
Ala Ala Pro Ser Gly Leu Gly Thr Asn Thr Met Ala Thr Gly Ser Gly
        195                 200                 205
Ala Pro Met Ala Asp Asn Asn Glu Gly Ala Asp Gly Val Gly Asn Ser
    210                 215                 220
Ser Gly Asn Trp His Cys Asp Ser Thr Trp Met Gly Asp Arg Val Ile
225                 230                 235                 240
Thr Thr Ser Thr Arg Thr Trp Ala Leu Pro Thr Phe Asn Asn His Leu
                245                 250                 255
Tyr Lys Gln Ile Ser Ser Gln Ser Gly Ala Ser Asn Asp Asn His Phe
            260                 265                 270
Phe Gly Tyr Ser Thr Pro Trp Gly Tyr Phe Asp Phe Asn Arg Phe His
        275                 280                 285
Cys His Phe Ser Pro Arg Asp Trp Gln Arg Leu Ile Asn Asn Asn Trp
    290                 295                 300
Gly Phe Arg Pro Lys Arg Leu Asn Phe Lys Leu Phe Asn Ile Gln Val
305                 310                 315                 320
Lys Glu Val Thr Gln Asn Asp Gly Thr Thr Thr Ile Ala Asn Asn Leu
                325                 330                 335
Thr Ser Thr Val Gln Val Phe Thr Asp Ser Glu Tyr Gln Leu Pro Tyr
            340                 345                 350
Val Leu Gly Ser Ala His Gln Gly Cys Leu Pro Pro Phe Pro Ala Asp
        355                 360                 365
Val Phe Met Val Pro Gln Tyr Gly Tyr Leu Thr Leu Asn Asn Gly Ser
    370                 375                 380
Gln Ala Val Gly Arg Ser Ser Phe Tyr Cys Leu Glu Tyr Phe Pro Ser
385                 390                 395                 400
Gln Met Leu Arg Thr Gly Asn Asn Phe Thr Phe Ser Tyr Thr Phe Glu
                405                 410                 415
Asp Val Pro Phe His Ser Ser Tyr Ala His Ser Gln Ser Leu Asp Arg
            420                 425                 430
Leu Met Asn Pro Leu Ile Asp Gln Tyr Leu Tyr Phe Leu Ser Arg Thr
        435                 440                 445
```

Asn Thr Pro Ser Gly Thr Thr Thr Gln Ser Arg Leu Gln Phe Ser Gln
            450                 455                 460

Ala Gly Ala Ser Asp Ile Arg Asp Gln Ser Arg Asn Trp Leu Pro Gly
465                 470                 475                 480

Pro Cys Tyr Arg Gln Gln Arg Val Ser Lys Thr Ser Ala Asp Asn Asn
                485                 490                 495

Asn Ser Glu Phe Ser Trp Thr Gly Ala Thr Lys Tyr His Leu Asn Gly
            500                 505                 510

Arg Asp Ser Leu Val Asn Pro Gly Pro Ala Met Ala Ser His Lys Asp
            515                 520                 525

Asp Glu Glu Lys Phe Phe Pro Gln Ser Gly Val Leu Ile Phe Gly Lys
530                 535                 540

Gln Gly Ser Glu Lys Thr Asn Val Asp Ile Glu Lys Val Met Ile Thr
545                 550                 555                 560

Asp Glu Glu Glu Ile Arg Thr Thr Asn Pro Val Ala Thr Glu Gln Tyr
                565                 570                 575

Gly Ser Val Ser Thr Asn Leu Gln Arg Gly Asn Ala Ala Ser Ala
            580                 585                 590

Ser Glu Ala Ser Thr Ala Ala Arg Gln Ala Ala Thr Ala Asp Val Asn
595                 600                 605

Thr Gln Gly Val Leu Pro Gly Met Val Trp Gln Asp Arg Asp Val Tyr
610                 615                 620

Leu Gln Gly Pro Ile Trp Ala Lys Ile Pro His Thr Asp Gly His Phe
625                 630                 635                 640

His Pro Ser Pro Leu Met Gly Gly Phe Gly Leu Lys His Pro Pro Pro
                645                 650                 655

Gln Ile Leu Ile Lys Asn Thr Pro Val Pro Ala Asn Pro Ser Thr Thr
            660                 665                 670

Phe Ser Ala Ala Lys Phe Ala Ser Phe Ile Thr Gln Tyr Ser Thr Gly
            675                 680                 685

Gln Val Ser Val Glu Ile Glu Trp Glu Leu Gln Lys Glu Asn Ser Lys
690                 695                 700

Arg Trp Asn Pro Glu Ile Gln Phe Thr Ser Asn Tyr Asn Lys Ser Val
705                 710                 715                 720

Asn Val Asp Phe Thr Val Asp Thr Asn Gly Val Tyr Ser Glu Pro Arg
                725                 730                 735

Pro Ile Gly Thr Arg Phe Leu Thr Arg Asn Leu
            740                 745

<210> SEQ ID NO 3
<211> LENGTH: 747
<212> TYPE: PRT
<213> ORGANISM: Artificial Sequence
<220> FEATURE:
<223> OTHER INFORMATION: AAV2 capsid protein VP1 with insertion

<400> SEQUENCE: 3

Met Ala Ala Asp Gly Tyr Leu Pro Asp Trp Leu Glu Asp Thr Leu Ser
1               5                   10                  15

Glu Gly Ile Arg Gln Trp Trp Lys Leu Lys Pro Gly Pro Pro Pro
            20                  25                  30

Lys Pro Ala Glu Arg His Lys Asp Asp Ser Arg Gly Leu Val Leu Pro
            35                  40                  45

Gly Tyr Lys Tyr Leu Gly Pro Phe Asn Gly Leu Asp Lys Gly Glu Pro
50                  55                  60

```
Val Asn Glu Ala Asp Ala Ala Leu Glu His Asp Lys Ala Tyr Asp
 65                  70                  75                  80

Arg Gln Leu Asp Ser Gly Asp Asn Pro Tyr Leu Lys Tyr Asn His Ala
                 85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Val Leu Glu Pro
        115                 120                 125

Leu Gly Leu Val Glu Glu Pro Val Lys Thr Ala Pro Gly Lys Lys Arg
130                 135                 140

Pro Val Glu His Ser Pro Val Glu Pro Asp Ser Ser Gly Thr Gly
145                 150                 155                 160

Lys Ala Gly Gln Gln Pro Ala Arg Lys Arg Leu Asn Phe Gly Gln Thr
                165                 170                 175

Gly Asp Ala Asp Ser Val Pro Asp Pro Gln Pro Leu Gly Gln Pro Pro
            180                 185                 190

Ala Ala Pro Ser Gly Leu Gly Thr Asn Thr Met Ala Thr Gly Ser Gly
        195                 200                 205

Ala Pro Met Ala Asp Asn Asn Glu Gly Ala Asp Gly Val Gly Asn Ser
210                 215                 220

Ser Gly Asn Trp His Cys Asp Ser Thr Trp Met Gly Asp Arg Val Ile
225                 230                 235                 240

Thr Thr Ser Thr Arg Thr Trp Ala Leu Pro Thr Phe Asn Asn His Leu
                245                 250                 255

Tyr Lys Gln Ile Ser Ser Gln Ser Gly Ala Ser Asn Asp Asn His Phe
            260                 265                 270

Phe Gly Tyr Ser Thr Pro Trp Gly Tyr Phe Asp Phe Asn Arg Phe His
        275                 280                 285

Cys His Phe Ser Pro Arg Asp Trp Gln Arg Leu Ile Asn Asn Asn Trp
290                 295                 300

Gly Phe Arg Pro Lys Arg Leu Asn Phe Lys Leu Phe Asn Ile Gln Val
305                 310                 315                 320

Lys Glu Val Thr Gln Asn Asp Gly Thr Thr Thr Ile Ala Asn Asn Leu
                325                 330                 335

Thr Ser Thr Val Gln Val Phe Thr Asp Ser Glu Tyr Gln Leu Pro Tyr
            340                 345                 350

Val Leu Gly Ser Ala His Gln Gly Cys Leu Pro Pro Phe Pro Ala Asp
        355                 360                 365

Val Phe Met Val Pro Gln Tyr Gly Tyr Leu Thr Leu Asn Asn Gly Ser
370                 375                 380

Gln Ala Val Gly Arg Ser Ser Phe Tyr Cys Leu Glu Tyr Phe Pro Ser
385                 390                 395                 400

Gln Met Leu Arg Thr Gly Asn Asn Phe Thr Phe Ser Tyr Thr Phe Glu
                405                 410                 415

Asp Val Pro Phe His Ser Ser Tyr Ala His Ser Gln Ser Leu Asp Arg
            420                 425                 430

Leu Met Asn Pro Leu Ile Asp Gln Tyr Leu Tyr Phe Leu Ser Arg Thr
        435                 440                 445

Asn Thr Pro Ser Gly Thr Thr Thr Gln Ser Arg Leu Gln Phe Ser Gln
450                 455                 460

Ala Gly Ala Ser Asp Ile Arg Asp Gln Ser Arg Asn Trp Leu Pro Gly
465                 470                 475                 480
```

```
Pro Cys Tyr Arg Gln Gln Arg Val Ser Lys Thr Ser Ala Asp Asn Asn
                485                 490                 495
Asn Ser Glu Phe Ser Trp Thr Gly Ala Thr Lys Tyr His Leu Asn Gly
            500                 505                 510
Arg Asp Ser Leu Val Asn Pro Gly Pro Ala Met Ala Ser His Lys Asp
            515                 520                 525
Asp Glu Glu Lys Phe Phe Pro Gln Ser Gly Val Leu Ile Phe Gly Lys
            530                 535                 540
Gln Gly Ser Glu Lys Thr Asn Val Asp Ile Glu Lys Val Met Ile Thr
545                 550                 555                 560
Asp Glu Glu Glu Ile Arg Thr Thr Asn Pro Val Ala Thr Glu Gln Tyr
                565                 570                 575
Gly Ser Val Ser Thr Asn Leu Gln Arg Gly Asn Ala Ala Ala Asp Thr
                580                 585                 590
Arg Pro His Asp Gln Ala Ala Arg Gln Ala Ala Thr Ala Asp Val Asn
                595                 600                 605
Thr Gln Gly Val Leu Pro Gly Met Val Trp Gln Asp Arg Asp Val Tyr
                610                 615                 620
Leu Gln Gly Pro Ile Trp Ala Lys Ile Pro His Thr Asp Gly His Phe
625                 630                 635                 640
His Pro Ser Pro Leu Met Gly Gly Phe Gly Leu Lys His Pro Pro Pro
                645                 650                 655
Gln Ile Leu Ile Lys Asn Thr Pro Val Pro Ala Asn Pro Ser Thr Thr
                660                 665                 670
Phe Ser Ala Ala Lys Phe Ala Ser Phe Ile Thr Gln Tyr Ser Thr Gly
                675                 680                 685
Gln Val Ser Val Glu Ile Glu Trp Glu Leu Gln Lys Glu Asn Ser Lys
                690                 695                 700
Arg Trp Asn Pro Glu Ile Gln Phe Thr Ser Asn Tyr Asn Lys Ser Val
705                 710                 715                 720
Asn Val Asp Phe Thr Val Asp Thr Asn Gly Val Tyr Ser Glu Pro Arg
                725                 730                 735
Pro Ile Gly Thr Arg Phe Leu Thr Arg Asn Leu
                740                 745

<210> SEQ ID NO 4
<211> LENGTH: 747
<212> TYPE: PRT
<213> ORGANISM: Artificial Sequence
<220> FEATURE:
<223> OTHER INFORMATION: AAV2 capsid protein VP1 with insertion

<400> SEQUENCE: 4

Met Ala Ala Asp Gly Tyr Leu Pro Asp Trp Leu Glu Asp Thr Leu Ser
1               5                   10                  15
Glu Gly Ile Arg Gln Trp Trp Lys Leu Lys Pro Gly Pro Pro Pro Pro
                20                  25                  30
Lys Pro Ala Glu Arg His Lys Asp Asp Ser Arg Gly Leu Val Leu Pro
            35                  40                  45
Gly Tyr Lys Tyr Leu Gly Pro Phe Asn Gly Leu Asp Lys Gly Glu Pro
            50                  55                  60
Val Asn Glu Ala Asp Ala Ala Ala Leu Glu His Asp Lys Ala Tyr Asp
65                  70                  75                  80
Arg Gln Leu Asp Ser Gly Asp Asn Pro Tyr Leu Lys Tyr Asn His Ala
                85                  90                  95
```

-continued

```
Asp Ala Glu Phe Gln Glu Arg Leu Lys Glu Asp Thr Ser Phe Gly Gly
            100                 105                 110
Asn Leu Gly Arg Ala Val Phe Gln Ala Lys Lys Arg Val Leu Glu Pro
        115                 120                 125
Leu Gly Leu Val Glu Pro Val Lys Thr Ala Pro Gly Lys Lys Arg
130                 135                 140
Pro Val Glu His Ser Pro Val Glu Pro Asp Ser Ser Gly Thr Gly
145                 150                 155                 160
Lys Ala Gly Gln Gln Pro Ala Arg Lys Arg Leu Asn Phe Gly Gln Thr
                165                 170                 175
Gly Asp Ala Asp Ser Val Pro Asp Pro Gln Pro Leu Gly Gln Pro Pro
            180                 185                 190
Ala Ala Pro Ser Gly Leu Gly Thr Asn Thr Met Ala Thr Gly Ser Gly
        195                 200                 205
Ala Pro Met Ala Asp Asn Asn Glu Gly Ala Asp Gly Val Gly Asn Ser
    210                 215                 220
Ser Gly Asn Trp His Cys Asp Ser Thr Trp Met Gly Asp Arg Val Ile
225                 230                 235                 240
Thr Thr Ser Thr Arg Thr Trp Ala Leu Pro Thr Phe Asn Asn His Leu
                245                 250                 255
Tyr Lys Gln Ile Ser Ser Gln Ser Gly Ala Ser Asn Asp Asn His Phe
            260                 265                 270
Phe Gly Tyr Ser Thr Pro Trp Gly Tyr Phe Asp Phe Asn Arg Phe His
        275                 280                 285
Cys His Phe Ser Pro Arg Asp Trp Gln Arg Leu Ile Asn Asn Asn Trp
    290                 295                 300
Gly Phe Arg Pro Lys Arg Leu Asn Phe Lys Leu Phe Asn Ile Gln Val
305                 310                 315                 320
Lys Glu Val Thr Gln Asn Asp Gly Thr Thr Thr Ile Ala Asn Asn Leu
                325                 330                 335
Thr Ser Thr Val Gln Val Phe Thr Asp Ser Glu Tyr Gln Leu Pro Tyr
            340                 345                 350
Val Leu Gly Ser Ala His Gln Gly Cys Leu Pro Pro Phe Pro Ala Asp
        355                 360                 365
Val Phe Met Val Pro Gln Tyr Gly Tyr Leu Thr Leu Asn Asn Gly Ser
    370                 375                 380
Gln Ala Val Gly Arg Ser Ser Phe Tyr Cys Leu Glu Tyr Phe Pro Ser
385                 390                 395                 400
Gln Met Leu Arg Thr Gly Asn Asn Phe Thr Phe Ser Tyr Thr Phe Glu
                405                 410                 415
Asp Val Pro Phe His Ser Ser Tyr Ala His Ser Gln Ser Leu Asp Arg
            420                 425                 430
Leu Met Asn Pro Leu Ile Asp Gln Tyr Leu Tyr Phe Leu Ser Arg Thr
        435                 440                 445
Asn Thr Pro Ser Gly Thr Thr Thr Gln Ser Arg Leu Gln Phe Ser Gln
    450                 455                 460
Ala Gly Ala Ser Asp Ile Arg Asp Gln Ser Arg Asn Trp Leu Pro Gly
465                 470                 475                 480
Pro Cys Tyr Arg Gln Gln Arg Val Ser Lys Thr Ser Ala Asp Asn Asn
                485                 490                 495
Asn Ser Glu Phe Ser Trp Thr Gly Ala Thr Lys Tyr His Leu Asn Gly
            500                 505                 510
Arg Asp Ser Leu Val Asn Pro Gly Pro Ala Met Ala Ser His Lys Asp
```

```
            515                 520                 525
Asp Glu Glu Lys Phe Phe Pro Gln Ser Gly Val Leu Ile Phe Gly Lys
    530                 535                 540

Gln Gly Ser Glu Lys Thr Asn Val Asp Ile Glu Lys Val Met Ile Thr
545                 550                 555                 560

Asp Glu Glu Glu Ile Arg Thr Thr Asn Pro Val Ala Thr Glu Gln Tyr
                565                 570                 575

Gly Ser Val Ser Thr Asn Leu Gln Arg Gly Asn Ala Ala Ala Glu His
            580                 585                 590

Tyr Asn Ser Thr Cys Ala Ala Arg Gln Ala Ala Thr Ala Asp Val Asn
        595                 600                 605

Thr Gln Gly Val Leu Pro Gly Met Val Trp Gln Asp Arg Asp Val Tyr
    610                 615                 620

Leu Gln Gly Pro Ile Trp Ala Lys Ile Pro His Thr Asp Gly His Phe
625                 630                 635                 640

His Pro Ser Pro Leu Met Gly Gly Phe Gly Leu Lys His Pro Pro Pro
                645                 650                 655

Gln Ile Leu Ile Lys Asn Thr Pro Val Pro Ala Asn Pro Ser Thr Thr
            660                 665                 670

Phe Ser Ala Ala Lys Phe Ala Ser Phe Ile Thr Gln Tyr Ser Thr Gly
        675                 680                 685

Gln Val Ser Val Glu Ile Glu Trp Glu Leu Gln Lys Glu Asn Ser Lys
    690                 695                 700

Arg Trp Asn Pro Glu Ile Gln Phe Thr Ser Asn Tyr Asn Lys Ser Val
705                 710                 715                 720

Asn Val Asp Phe Thr Val Asp Thr Asn Gly Val Tyr Ser Glu Pro Arg
                725                 730                 735

Pro Ile Gly Thr Arg Phe Leu Thr Arg Asn Leu
            740                 745

<210> SEQ ID NO 5
<211> LENGTH: 747
<212> TYPE: PRT
<213> ORGANISM: Artificial Sequence
<220> FEATURE:
<223> OTHER INFORMATION: AAV2 capsid protein VP1 with insertion

<400> SEQUENCE: 5

Met Ala Ala Asp Gly Tyr Leu Pro Asp Trp Leu Glu Asp Thr Leu Ser
1               5                   10                  15

Glu Gly Ile Arg Gln Trp Trp Lys Leu Lys Pro Gly Pro Pro Pro Pro
            20                  25                  30

Lys Pro Ala Glu Arg His Lys Asp Asp Ser Arg Gly Leu Val Leu Pro
        35                  40                  45

Gly Tyr Lys Tyr Leu Gly Pro Phe Asn Gly Leu Asp Lys Gly Glu Pro
    50                  55                  60

Val Asn Glu Ala Asp Ala Ala Ala Leu Glu His Asp Lys Ala Tyr Asp
65                  70                  75                  80

Arg Gln Leu Asp Ser Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Val Leu Glu Pro
        115                 120                 125

Leu Gly Leu Val Glu Glu Pro Val Lys Thr Ala Pro Gly Lys Lys Arg
```

```
            130                 135                 140
Pro Val Glu His Ser Pro Val Glu Pro Asp Ser Ser Gly Thr Gly
145                 150                 155                 160

Lys Ala Gly Gln Gln Pro Ala Arg Lys Arg Leu Asn Phe Gly Gln Thr
                165                 170                 175

Gly Asp Ala Asp Ser Val Pro Asp Pro Gln Pro Leu Gly Gln Pro Pro
            180                 185                 190

Ala Ala Pro Ser Gly Leu Gly Thr Asn Thr Met Ala Thr Gly Ser Gly
            195                 200                 205

Ala Pro Met Ala Asp Asn Asn Glu Gly Ala Asp Gly Val Gly Asn Ser
210                 215                 220

Ser Gly Asn Trp His Cys Asp Ser Thr Trp Met Gly Asp Arg Val Ile
225                 230                 235                 240

Thr Thr Ser Thr Arg Thr Trp Ala Leu Pro Thr Phe Asn Asn His Leu
                245                 250                 255

Tyr Lys Gln Ile Ser Ser Gln Ser Gly Ala Ser Asn Asp Asn His Phe
                260                 265                 270

Phe Gly Tyr Ser Thr Pro Trp Gly Tyr Phe Asp Phe Asn Arg Phe His
            275                 280                 285

Cys His Phe Ser Pro Arg Asp Trp Gln Arg Leu Ile Asn Asn Asn Trp
            290                 295                 300

Gly Phe Arg Pro Lys Arg Leu Asn Phe Lys Leu Phe Asn Ile Gln Val
305                 310                 315                 320

Lys Glu Val Thr Gln Asn Asp Gly Thr Thr Ile Ala Asn Asn Leu
                325                 330                 335

Thr Ser Thr Val Gln Val Phe Thr Asp Ser Glu Tyr Gln Leu Pro Tyr
            340                 345                 350

Val Leu Gly Ser Ala His Gln Gly Cys Leu Pro Pro Phe Pro Ala Asp
            355                 360                 365

Val Phe Met Val Pro Gln Tyr Gly Tyr Leu Thr Leu Asn Asn Gly Ser
            370                 375                 380

Gln Ala Val Gly Arg Ser Ser Phe Tyr Cys Leu Glu Tyr Phe Pro Ser
385                 390                 395                 400

Gln Met Leu Arg Thr Gly Asn Asn Phe Thr Phe Ser Tyr Thr Phe Glu
                405                 410                 415

Asp Val Pro Phe His Ser Ser Tyr Ala His Ser Gln Ser Leu Asp Arg
            420                 425                 430

Leu Met Asn Pro Leu Ile Asp Gln Tyr Leu Tyr Phe Leu Ser Arg Thr
            435                 440                 445

Asn Thr Pro Ser Gly Thr Thr Thr Gln Ser Arg Leu Gln Phe Ser Gln
450                 455                 460

Ala Gly Ala Ser Asp Ile Arg Asp Gln Ser Arg Asn Trp Leu Pro Gly
465                 470                 475                 480

Pro Cys Tyr Arg Gln Gln Arg Val Ser Lys Thr Ser Ala Asp Asn Asn
                485                 490                 495

Asn Ser Glu Phe Ser Trp Thr Gly Ala Thr Lys Tyr His Leu Asn Gly
            500                 505                 510

Arg Asp Ser Leu Val Asn Pro Gly Pro Ala Met Ala Ser His Lys Asp
            515                 520                 525

Asp Glu Glu Lys Phe Phe Pro Gln Ser Gly Val Leu Ile Phe Gly Lys
            530                 535                 540

Gln Gly Ser Glu Lys Thr Asn Val Asp Ile Glu Lys Val Met Ile Thr
545                 550                 555                 560
```

```
Asp Glu Glu Glu Ile Arg Thr Thr Asn Pro Val Ala Thr Glu Gln Tyr
                565                 570                 575
Gly Ser Val Ser Thr Asn Leu Gln Arg Gly Asn Ala Ala Pro Asn
            580                 585                 590
Pro Asn Cys Thr Leu Ala Ala Arg Gln Ala Ala Thr Ala Asp Val Asn
            595                 600                 605
Thr Gln Gly Val Leu Pro Gly Met Val Trp Gln Asp Arg Asp Val Tyr
        610                 615                 620
Leu Gln Gly Pro Ile Trp Ala Lys Ile Pro His Thr Asp Gly His Phe
625                 630                 635                 640
His Pro Ser Pro Leu Met Gly Gly Phe Gly Leu Lys His Pro Pro Pro
                645                 650                 655
Gln Ile Leu Ile Lys Asn Thr Pro Val Pro Ala Asn Pro Ser Thr Thr
                660                 665                 670
Phe Ser Ala Ala Lys Phe Ala Ser Phe Ile Thr Gln Tyr Ser Thr Gly
            675                 680                 685
Gln Val Ser Val Glu Ile Glu Trp Glu Leu Gln Lys Glu Asn Ser Lys
        690                 695                 700
Arg Trp Asn Pro Glu Ile Gln Phe Thr Ser Asn Tyr Asn Lys Ser Val
705                 710                 715                 720
Asn Val Asp Phe Thr Val Asp Thr Asn Gly Val Tyr Ser Glu Pro Arg
                725                 730                 735
Pro Ile Gly Thr Arg Phe Leu Thr Arg Asn Leu
                740                 745

<210> SEQ ID NO 6
<211> LENGTH: 747
<212> TYPE: PRT
<213> ORGANISM: Artificial Sequence
<220> FEATURE:
<223> OTHER INFORMATION: AAV2 capsid protein VP1 with insertion

<400> SEQUENCE: 6

Met Ala Ala Asp Gly Tyr Leu Pro Asp Trp Leu Glu Asp Thr Leu Ser
1               5                   10                  15
Glu Gly Ile Arg Gln Trp Trp Lys Leu Lys Pro Gly Pro Pro Pro
            20                  25                  30
Lys Pro Ala Glu Arg His Lys Asp Asp Ser Arg Gly Leu Val Leu Pro
        35                  40                  45
Gly Tyr Lys Tyr Leu Gly Pro Phe Asn Gly Leu Asp Lys Gly Glu Pro
    50                  55                  60
Val Asn Glu Ala Asp Ala Ala Leu Glu His Asp Lys Ala Tyr Asp
65                  70                  75                  80
Arg Gln Leu Asp Ser Gly Asp Asn Pro Tyr Leu Lys Tyr Asn His Ala
                85                  90                  95
Asp Ala Glu Phe Gln Glu Arg Leu Lys Glu Asp Thr Ser Phe Gly Gly
            100                 105                 110
Asn Leu Gly Arg Ala Val Phe Gln Ala Lys Lys Arg Val Leu Glu Pro
        115                 120                 125
Leu Gly Leu Val Glu Glu Pro Val Lys Thr Ala Pro Gly Lys Lys Arg
    130                 135                 140
Pro Val Glu His Ser Pro Val Glu Pro Asp Ser Ser Ser Gly Thr Gly
145                 150                 155                 160
Lys Ala Gly Gln Gln Pro Ala Arg Lys Arg Leu Asn Phe Gly Gln Thr
                165                 170                 175
```

```
Gly Asp Ala Asp Ser Val Pro Asp Pro Gln Pro Leu Gly Gln Pro Pro
            180                 185                 190

Ala Ala Pro Ser Gly Leu Gly Thr Asn Thr Met Ala Thr Gly Ser Gly
            195                 200                 205

Ala Pro Met Ala Asp Asn Asn Glu Gly Ala Asp Gly Val Gly Asn Ser
        210                 215                 220

Ser Gly Asn Trp His Cys Asp Ser Thr Trp Met Gly Asp Arg Val Ile
225                 230                 235                 240

Thr Thr Ser Thr Arg Thr Trp Ala Leu Pro Thr Phe Asn Asn His Leu
                245                 250                 255

Tyr Lys Gln Ile Ser Ser Gln Ser Gly Ala Ser Asn Asp Asn His Phe
            260                 265                 270

Phe Gly Tyr Ser Thr Pro Trp Gly Tyr Phe Asp Phe Asn Arg Phe His
            275                 280                 285

Cys His Phe Ser Pro Arg Asp Trp Gln Arg Leu Ile Asn Asn Asn Trp
        290                 295                 300

Gly Phe Arg Pro Lys Arg Leu Asn Phe Lys Leu Phe Asn Ile Gln Val
305                 310                 315                 320

Lys Glu Val Thr Gln Asn Asp Gly Thr Thr Thr Ile Ala Asn Asn Leu
                325                 330                 335

Thr Ser Thr Val Gln Val Phe Thr Asp Ser Glu Tyr Gln Leu Pro Tyr
            340                 345                 350

Val Leu Gly Ser Ala His Gln Gly Cys Leu Pro Pro Phe Pro Ala Asp
            355                 360                 365

Val Phe Met Val Pro Gln Tyr Gly Tyr Leu Thr Leu Asn Asn Gly Ser
        370                 375                 380

Gln Ala Val Gly Arg Ser Ser Phe Tyr Cys Leu Glu Tyr Phe Pro Ser
385                 390                 395                 400

Gln Met Leu Arg Thr Gly Asn Asn Phe Thr Phe Ser Tyr Thr Phe Glu
                405                 410                 415

Asp Val Pro Phe His Ser Ser Tyr Ala His Ser Gln Ser Leu Asp Arg
            420                 425                 430

Leu Met Asn Pro Leu Ile Asp Gln Tyr Leu Tyr Phe Leu Ser Arg Thr
            435                 440                 445

Asn Thr Pro Ser Gly Thr Thr Thr Gln Ser Arg Leu Gln Phe Ser Gln
        450                 455                 460

Ala Gly Ala Ser Asp Ile Arg Asp Gln Ser Arg Asn Trp Leu Pro Gly
465                 470                 475                 480

Pro Cys Tyr Arg Gln Gln Arg Val Ser Lys Thr Ser Ala Asp Asn Asn
                485                 490                 495

Asn Ser Glu Phe Ser Trp Thr Gly Ala Thr Lys Tyr His Leu Asn Gly
            500                 505                 510

Arg Asp Ser Leu Val Asn Pro Gly Pro Ala Met Ala Ser His Lys Asp
            515                 520                 525

Asp Glu Glu Lys Phe Phe Pro Gln Ser Gly Val Leu Ile Phe Gly Lys
        530                 535                 540

Gln Gly Ser Glu Lys Thr Asn Val Asp Ile Glu Lys Val Met Ile Thr
545                 550                 555                 560

Asp Glu Glu Glu Ile Arg Thr Thr Asn Pro Val Ala Thr Glu Gln Tyr
                565                 570                 575

Gly Ser Val Ser Thr Asn Leu Gln Arg Gly Asn Ala Ala Ala Thr Pro
            580                 585                 590
```

```
Pro Ser Ile Thr Ala Ala Ala Arg Gln Ala Ala Thr Ala Asp Val Asn
        595                 600                 605

Thr Gln Gly Val Leu Pro Gly Met Val Trp Gln Asp Arg Asp Val Tyr
610                 615                 620

Leu Gln Gly Pro Ile Trp Ala Lys Ile Pro His Thr Asp Gly His Phe
625                 630                 635                 640

His Pro Ser Pro Leu Met Gly Gly Phe Gly Leu Lys His Pro Pro Pro
                645                 650                 655

Gln Ile Leu Ile Lys Asn Thr Pro Val Pro Ala Asn Pro Ser Thr Thr
            660                 665                 670

Phe Ser Ala Ala Lys Phe Ala Ser Phe Ile Thr Gln Tyr Ser Thr Gly
        675                 680                 685

Gln Val Ser Val Glu Ile Glu Trp Glu Leu Gln Lys Glu Asn Ser Lys
    690                 695                 700

Arg Trp Asn Pro Glu Ile Gln Phe Thr Ser Asn Tyr Asn Lys Ser Val
705                 710                 715                 720

Asn Val Asp Phe Thr Val Asp Thr Asn Gly Val Tyr Ser Glu Pro Arg
                725                 730                 735

Pro Ile Gly Thr Arg Phe Leu Thr Arg Asn Leu
            740                 745

<210> SEQ ID NO 7
<211> LENGTH: 747
<212> TYPE: PRT
<213> ORGANISM: Artificial Sequence
<220> FEATURE:
<223> OTHER INFORMATION: AAV2 capsid protein VP1 with insertion

<400> SEQUENCE: 7

Met Ala Ala Asp Gly Tyr Leu Pro Asp Trp Leu Glu Asp Thr Leu Ser
1               5                   10                  15

Glu Gly Ile Arg Gln Trp Trp Lys Leu Lys Pro Gly Pro Pro Pro Pro
            20                  25                  30

Lys Pro Ala Glu Arg His Lys Asp Asp Ser Arg Gly Leu Val Leu Pro
        35                  40                  45

Gly Tyr Lys Tyr Leu Gly Pro Phe Asn Gly Leu Asp Lys Gly Glu Pro
    50                  55                  60

Val Asn Glu Ala Asp Ala Ala Ala Leu Glu His Asp Lys Ala Tyr Asp
65                  70                  75                  80

Arg Gln Leu Asp Ser Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Val Leu Glu Pro
        115                 120                 125

Leu Gly Leu Val Glu Glu Pro Val Lys Thr Ala Pro Gly Lys Lys Arg
    130                 135                 140

Pro Val Glu His Ser Pro Val Glu Pro Asp Ser Ser Ser Gly Thr Gly
145                 150                 155                 160

Lys Ala Gly Gln Gln Pro Ala Arg Lys Arg Leu Asn Phe Gly Gln Thr
                165                 170                 175

Gly Asp Ala Asp Ser Val Pro Asp Pro Gln Pro Leu Gly Gln Pro Pro
            180                 185                 190

Ala Ala Pro Ser Gly Leu Gly Thr Asn Thr Met Ala Thr Gly Ser Gly
        195                 200                 205
```

```
Ala Pro Met Ala Asp Asn Asn Glu Gly Ala Asp Gly Val Gly Asn Ser
    210                 215                 220
Ser Gly Asn Trp His Cys Asp Ser Thr Trp Met Gly Asp Arg Val Ile
225                 230                 235                 240
Thr Thr Ser Thr Arg Thr Trp Ala Leu Pro Thr Phe Asn Asn His Leu
            245                 250                 255
Tyr Lys Gln Ile Ser Ser Gln Ser Gly Ala Ser Asn Asp Asn His Phe
        260                 265                 270
Phe Gly Tyr Ser Thr Pro Trp Gly Tyr Phe Asp Phe Asn Arg Phe His
            275                 280                 285
Cys His Phe Ser Pro Arg Asp Trp Gln Arg Leu Ile Asn Asn Asn Trp
    290                 295                 300
Gly Phe Arg Pro Lys Arg Leu Asn Phe Lys Leu Phe Asn Ile Gln Val
305                 310                 315                 320
Lys Glu Val Thr Gln Asn Asp Gly Thr Thr Thr Ile Ala Asn Asn Leu
            325                 330                 335
Thr Ser Thr Val Gln Val Phe Thr Asp Ser Glu Tyr Gln Leu Pro Tyr
        340                 345                 350
Val Leu Gly Ser Ala His Gln Gly Cys Leu Pro Pro Phe Pro Ala Asp
            355                 360                 365
Val Phe Met Val Pro Gln Tyr Gly Tyr Leu Thr Leu Asn Asn Gly Ser
    370                 375                 380
Gln Ala Val Gly Arg Ser Ser Phe Tyr Cys Leu Glu Tyr Phe Pro Ser
385                 390                 395                 400
Gln Met Leu Arg Thr Gly Asn Asn Phe Thr Phe Ser Tyr Thr Phe Glu
            405                 410                 415
Asp Val Pro Phe His Ser Ser Tyr Ala His Ser Gln Ser Leu Asp Arg
        420                 425                 430
Leu Met Asn Pro Leu Ile Asp Gln Tyr Leu Tyr Phe Leu Ser Arg Thr
    435                 440                 445
Asn Thr Pro Ser Gly Thr Thr Thr Gln Ser Arg Leu Gln Phe Ser Gln
    450                 455                 460
Ala Gly Ala Ser Asp Ile Arg Asp Gln Ser Arg Asn Trp Leu Pro Gly
465                 470                 475                 480
Pro Cys Tyr Arg Gln Gln Arg Val Ser Lys Thr Ser Ala Asp Asn Asn
            485                 490                 495
Asn Ser Glu Phe Ser Trp Thr Gly Ala Thr Lys Tyr His Leu Asn Gly
        500                 505                 510
Arg Asp Ser Leu Val Asn Pro Gly Pro Ala Met Ala Ser His Lys Asp
    515                 520                 525
Asp Glu Glu Lys Phe Phe Pro Gln Ser Gly Val Leu Ile Phe Gly Lys
    530                 535                 540
Gln Gly Ser Glu Lys Thr Asn Val Asp Ile Glu Lys Val Met Ile Thr
545                 550                 555                 560
Asp Glu Glu Glu Ile Arg Thr Thr Asn Pro Val Ala Thr Glu Gln Tyr
            565                 570                 575
Gly Ser Val Ser Thr Asn Leu Gln Arg Gly Asn Ala Ala Ala Cys Gly
        580                 585                 590
Glu Ser Ser Tyr Leu Ala Ala Arg Gln Ala Ala Thr Ala Asp Val Asn
            595                 600                 605
Thr Gln Gly Val Leu Pro Gly Met Val Trp Gln Asp Arg Asp Val Tyr
    610                 615                 620
Leu Gln Gly Pro Ile Trp Ala Lys Ile Pro His Thr Asp Gly His Phe
```

-continued

```
                625                 630                 635                 640
His Pro Ser Pro Leu Met Gly Gly Phe Gly Leu Lys His Pro Pro
                    645                 650                 655
Gln Ile Leu Ile Lys Asn Thr Pro Val Pro Ala Asn Pro Ser Thr Thr
                    660                 665                 670
Phe Ser Ala Ala Lys Phe Ala Ser Phe Ile Thr Gln Tyr Ser Thr Gly
                    675                 680                 685
Gln Val Ser Val Glu Ile Glu Trp Glu Leu Gln Lys Glu Asn Ser Lys
                690                 695                 700
Arg Trp Asn Pro Glu Ile Gln Phe Thr Ser Asn Tyr Asn Lys Ser Val
705                 710                 715                 720
Asn Val Asp Phe Thr Val Asp Thr Asn Gly Val Tyr Ser Glu Pro Arg
                    725                 730                 735
Pro Ile Gly Thr Arg Phe Leu Thr Arg Asn Leu
                    740                 745

<210> SEQ ID NO 8
<211> LENGTH: 747
<212> TYPE: PRT
<213> ORGANISM: Artificial Sequence
<220> FEATURE:
<223> OTHER INFORMATION: AAV2 capsid protein VP1 with insertion

<400> SEQUENCE: 8

Met Ala Ala Asp Gly Tyr Leu Pro Asp Trp Leu Glu Asp Thr Leu Ser
1               5                   10                  15
Glu Gly Ile Arg Gln Trp Trp Lys Leu Lys Pro Gly Pro Pro Pro Pro
                20                  25                  30
Lys Pro Ala Glu Arg His Lys Asp Asp Ser Arg Gly Leu Val Leu Pro
            35                  40                  45
Gly Tyr Lys Tyr Leu Gly Pro Phe Asn Gly Leu Asp Lys Gly Glu Pro
        50                  55                  60
Val Asn Glu Ala Asp Ala Ala Ala Leu Glu His Asp Lys Ala Tyr Asp
65                  70                  75                  80
Arg Gln Leu Asp Ser Gly Asp Asn Pro Tyr Leu Lys Tyr Asn His Ala
                85                  90                  95
Asp Ala Glu Phe Gln Glu Arg Leu Lys Glu Asp Thr Ser Phe Gly Gly
            100                 105                 110
Asn Leu Gly Arg Ala Val Phe Gln Ala Lys Lys Arg Val Leu Glu Pro
        115                 120                 125
Leu Gly Leu Val Glu Glu Pro Val Lys Thr Ala Pro Gly Lys Lys Arg
    130                 135                 140
Pro Val Glu His Ser Pro Val Glu Pro Asp Ser Ser Ser Gly Thr Gly
145                 150                 155                 160
Lys Ala Gly Gln Gln Pro Ala Arg Lys Arg Leu Asn Phe Gly Gln Thr
                165                 170                 175
Gly Asp Ala Asp Ser Val Pro Asp Pro Gln Pro Leu Gly Gln Pro Pro
            180                 185                 190
Ala Ala Pro Ser Gly Leu Gly Thr Asn Thr Met Ala Thr Gly Ser Gly
        195                 200                 205
Ala Pro Met Ala Asp Asn Asn Glu Gly Ala Asp Gly Val Gly Asn Ser
    210                 215                 220
Ser Gly Asn Trp His Cys Asp Ser Thr Trp Met Gly Asp Arg Val Ile
225                 230                 235                 240
Thr Thr Ser Thr Arg Thr Trp Ala Leu Pro Thr Phe Asn Asn His Leu
```

-continued

```
                245                 250                 255
Tyr Lys Gln Ile Ser Ser Gln Ser Gly Ala Ser Asn Asp Asn His Phe
                260                 265                 270
Phe Gly Tyr Ser Thr Pro Trp Gly Tyr Phe Asp Phe Asn Arg Phe His
                275                 280                 285
Cys His Phe Ser Pro Arg Asp Trp Gln Arg Leu Ile Asn Asn Asn Trp
            290                 295                 300
Gly Phe Arg Pro Lys Arg Leu Asn Phe Lys Leu Phe Asn Ile Gln Val
305                 310                 315                 320
Lys Glu Val Thr Gln Asn Asp Gly Thr Thr Ile Ala Asn Asn Leu
                325                 330                 335
Thr Ser Thr Val Gln Val Phe Thr Asp Ser Glu Tyr Gln Leu Pro Tyr
                340                 345                 350
Val Leu Gly Ser Ala His Gln Gly Cys Leu Pro Pro Phe Pro Ala Asp
                355                 360                 365
Val Phe Met Val Pro Gln Tyr Gly Tyr Leu Thr Leu Asn Asn Gly Ser
            370                 375                 380
Gln Ala Val Gly Arg Ser Ser Phe Tyr Cys Leu Glu Tyr Phe Pro Ser
385                 390                 395                 400
Gln Met Leu Arg Thr Gly Asn Asn Phe Thr Phe Ser Tyr Thr Phe Glu
                405                 410                 415
Asp Val Pro Phe His Ser Ser Tyr Ala His Ser Gln Ser Leu Asp Arg
                420                 425                 430
Leu Met Asn Pro Leu Ile Asp Gln Tyr Leu Tyr Phe Leu Ser Arg Thr
            435                 440                 445
Asn Thr Pro Ser Gly Thr Thr Thr Gln Ser Arg Leu Gln Phe Ser Gln
450                 455                 460
Ala Gly Ala Ser Asp Ile Arg Asp Gln Ser Arg Asn Trp Leu Pro Gly
465                 470                 475                 480
Pro Cys Tyr Arg Gln Gln Arg Val Ser Lys Thr Ser Ala Asp Asn Asn
                485                 490                 495
Asn Ser Glu Phe Ser Trp Thr Gly Ala Thr Lys Tyr His Leu Asn Gly
            500                 505                 510
Arg Asp Ser Leu Val Asn Pro Gly Pro Ala Met Ala Ser His Lys Asp
            515                 520                 525
Asp Glu Glu Lys Phe Phe Pro Gln Ser Gly Val Leu Ile Phe Gly Lys
            530                 535                 540
Gln Gly Ser Glu Lys Thr Asn Val Asp Ile Glu Lys Val Met Ile Thr
545                 550                 555                 560
Asp Glu Glu Glu Ile Arg Thr Thr Asn Pro Val Ala Thr Glu Gln Tyr
                565                 570                 575
Gly Ser Val Ser Thr Asn Leu Gln Arg Gly Asn Ala Ala Pro Arg
            580                 585                 590
Thr Pro His Thr Ala Ala Arg Gln Ala Thr Ala Asp Val Asn
                595                 600                 605
Thr Gln Gly Val Leu Pro Gly Met Val Trp Gln Asp Arg Asp Val Tyr
            610                 615                 620
Leu Gln Gly Pro Ile Trp Ala Lys Ile Pro His Thr Asp Gly His Phe
625                 630                 635                 640
His Pro Ser Pro Leu Met Gly Gly Phe Gly Leu Lys His Pro Pro
                645                 650                 655
Gln Ile Leu Ile Lys Asn Thr Pro Val Pro Ala Asn Pro Ser Thr Thr
            660                 665                 670
```

```
Phe Ser Ala Ala Lys Phe Ala Ser Phe Ile Thr Gln Tyr Ser Thr Gly
            675                 680                 685

Gln Val Ser Val Glu Ile Glu Trp Glu Leu Gln Lys Glu Asn Ser Lys
        690                 695                 700

Arg Trp Asn Pro Glu Ile Gln Phe Thr Ser Asn Tyr Asn Lys Ser Val
705                 710                 715                 720

Asn Val Asp Phe Thr Val Asp Thr Asn Gly Val Tyr Ser Glu Pro Arg
                725                 730                 735

Pro Ile Gly Thr Arg Phe Leu Thr Arg Asn Leu
            740                 745

<210> SEQ ID NO 9
<211> LENGTH: 747
<212> TYPE: PRT
<213> ORGANISM: Artificial Sequence
<220> FEATURE:
<223> OTHER INFORMATION: AAV2 capsid protein VP1 with insertion

<400> SEQUENCE: 9

Met Ala Ala Asp Gly Tyr Leu Pro Asp Trp Leu Glu Asp Thr Leu Ser
1               5                   10                  15

Glu Gly Ile Arg Gln Trp Trp Lys Leu Lys Pro Gly Pro Pro Pro Pro
            20                  25                  30

Lys Pro Ala Glu Arg His Lys Asp Asp Ser Arg Gly Leu Val Leu Pro
        35                  40                  45

Gly Tyr Lys Tyr Leu Gly Pro Phe Asn Gly Leu Asp Lys Gly Glu Pro
    50                  55                  60

Val Asn Glu Ala Asp Ala Ala Ala Leu Glu His Asp Lys Ala Tyr Asp
65                  70                  75                  80

Arg Gln Leu Asp Ser Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Val Leu Glu Pro
        115                 120                 125

Leu Gly Leu Val Glu Glu Pro Val Lys Thr Ala Pro Gly Lys Lys Arg
    130                 135                 140

Pro Val Glu His Ser Pro Val Glu Pro Asp Ser Ser Ser Gly Thr Gly
145                 150                 155                 160

Lys Ala Gly Gln Gln Pro Ala Arg Lys Arg Leu Asn Phe Gly Gln Thr
                165                 170                 175

Gly Asp Ala Asp Ser Val Pro Asp Pro Gln Pro Leu Gly Gln Pro Pro
            180                 185                 190

Ala Ala Pro Ser Gly Leu Gly Thr Asn Thr Met Ala Thr Gly Ser Gly
        195                 200                 205

Ala Pro Met Ala Asp Asn Asn Glu Gly Ala Asp Gly Val Gly Asn Ser
    210                 215                 220

Ser Gly Asn Trp His Cys Asp Ser Thr Trp Met Gly Asp Arg Val Ile
225                 230                 235                 240

Thr Thr Ser Thr Arg Thr Trp Ala Leu Pro Thr Phe Asn Asn His Leu
                245                 250                 255

Tyr Lys Gln Ile Ser Ser Gln Ser Gly Ala Ser Asn Asp Asn His Phe
            260                 265                 270

Phe Gly Tyr Ser Thr Pro Trp Gly Tyr Phe Asp Phe Asn Arg Phe His
        275                 280                 285
```

```
Cys His Phe Ser Pro Arg Asp Trp Gln Arg Leu Ile Asn Asn Asn Trp
    290             295             300

Gly Phe Arg Pro Lys Arg Leu Asn Phe Lys Leu Phe Asn Ile Gln Val
305             310             315                         320

Lys Glu Val Thr Gln Asn Asp Gly Thr Thr Ile Ala Asn Asn Leu
            325             330                 335

Thr Ser Thr Val Gln Val Phe Thr Asp Ser Glu Tyr Gln Leu Pro Tyr
            340             345             350

Val Leu Gly Ser Ala His Gln Gly Cys Leu Pro Pro Phe Pro Ala Asp
        355             360             365

Val Phe Met Val Pro Gln Tyr Gly Tyr Leu Thr Leu Asn Asn Gly Ser
    370             375             380

Gln Ala Val Gly Arg Ser Ser Phe Tyr Cys Leu Glu Tyr Phe Pro Ser
385             390             395                         400

Gln Met Leu Arg Thr Gly Asn Asn Phe Thr Phe Ser Tyr Thr Phe Glu
            405             410             415

Asp Val Pro Phe His Ser Ser Tyr Ala His Ser Gln Ser Leu Asp Arg
            420             425             430

Leu Met Asn Pro Leu Ile Asp Gln Tyr Leu Tyr Phe Leu Ser Arg Thr
            435             440             445

Asn Thr Pro Ser Gly Thr Thr Thr Gln Ser Arg Leu Gln Phe Ser Gln
450             455             460

Ala Gly Ala Ser Asp Ile Arg Asp Gln Ser Arg Asn Trp Leu Pro Gly
465             470             475             480

Pro Cys Tyr Arg Gln Gln Arg Val Ser Lys Thr Ser Ala Asp Asn Asn
            485             490             495

Asn Ser Glu Phe Ser Trp Thr Gly Ala Thr Lys Tyr His Leu Asn Gly
            500             505             510

Arg Asp Ser Leu Val Asn Pro Gly Pro Ala Met Ala Ser His Lys Asp
            515             520             525

Asp Glu Glu Lys Phe Phe Pro Gln Ser Gly Val Leu Ile Phe Gly Lys
            530             535             540

Gln Gly Ser Glu Lys Thr Asn Val Asp Ile Glu Lys Val Met Ile Thr
545             550             555             560

Asp Glu Glu Glu Ile Arg Thr Thr Asn Pro Val Ala Thr Glu Gln Tyr
            565             570             575

Gly Ser Val Ser Thr Asn Leu Gln Arg Gly Asn Ala Ala Glu Leu
            580             585             590

Cys Asp Gly Phe Ala Ala Ala Arg Gln Ala Ala Thr Ala Asp Val Asn
            595             600             605

Thr Gln Gly Val Leu Pro Gly Met Val Trp Gln Asp Arg Asp Val Tyr
            610             615             620

Leu Gln Gly Pro Ile Trp Ala Lys Ile Pro His Thr Asp Gly His Phe
625             630             635             640

His Pro Ser Pro Leu Met Gly Gly Phe Gly Leu Lys His Pro Pro
            645             650             655

Gln Ile Leu Ile Lys Asn Thr Pro Val Pro Ala Asn Pro Ser Thr Thr
            660             665             670

Phe Ser Ala Ala Lys Phe Ala Ser Phe Ile Thr Gln Tyr Ser Thr Gly
            675             680             685

Gln Val Ser Val Glu Ile Glu Trp Glu Leu Gln Lys Glu Asn Ser Lys
            690             695             700
```

```
Arg Trp Asn Pro Glu Ile Gln Phe Thr Ser Asn Tyr Asn Lys Ser Val
705                 710                 715                 720

Asn Val Asp Phe Thr Val Asp Thr Asn Gly Val Tyr Ser Glu Pro Arg
            725                 730                 735

Pro Ile Gly Thr Arg Phe Leu Thr Arg Asn Leu
            740                 745
```

<210> SEQ ID NO 10
<211> LENGTH: 7
<212> TYPE: PRT
<213> ORGANISM: Artificial Sequence
<220> FEATURE:
<223> OTHER INFORMATION: heptamer insert

<400> SEQUENCE: 10

```
Ser Ala Ser Glu Ala Ser Thr
1               5
```

<210> SEQ ID NO 11
<211> LENGTH: 7
<212> TYPE: PRT
<213> ORGANISM: Artificial Sequence
<220> FEATURE:
<223> OTHER INFORMATION: heptamer insert

<400> SEQUENCE: 11

```
Asp Thr Arg Pro His Asp Gln
1               5
```

<210> SEQ ID NO 12
<211> LENGTH: 7
<212> TYPE: PRT
<213> ORGANISM: Artificial Sequence
<220> FEATURE:
<223> OTHER INFORMATION: heptamer insert

<400> SEQUENCE: 12

```
Glu His Tyr Asn Ser Thr Cys
1               5
```

<210> SEQ ID NO 13
<211> LENGTH: 7
<212> TYPE: PRT
<213> ORGANISM: Artificial Sequence
<220> FEATURE:
<223> OTHER INFORMATION: heptamer insert

<400> SEQUENCE: 13

```
Pro Asn Pro Asn Cys Thr Leu
1               5
```

<210> SEQ ID NO 14
<211> LENGTH: 7
<212> TYPE: PRT
<213> ORGANISM: Artificial Sequence
<220> FEATURE:
<223> OTHER INFORMATION: heptamer insert

<400> SEQUENCE: 14

```
Thr Pro Pro Ser Ile Thr Ala
1               5
```

<210> SEQ ID NO 15
<211> LENGTH: 7
<212> TYPE: PRT
<213> ORGANISM: Artificial Sequence

```
<220> FEATURE:
<223> OTHER INFORMATION: heptamer insert

<400> SEQUENCE: 15

Cys Gly Glu Ser Ser Tyr Leu
1               5

<210> SEQ ID NO 16
<211> LENGTH: 7
<212> TYPE: PRT
<213> ORGANISM: Artificial Sequence
<220> FEATURE:
<223> OTHER INFORMATION: heptamer insert

<400> SEQUENCE: 16

Pro Arg Thr Pro His Thr Ala
1               5

<210> SEQ ID NO 17
<211> LENGTH: 7
<212> TYPE: PRT
<213> ORGANISM: Artificial Sequence
<220> FEATURE:
<223> OTHER INFORMATION: heptamer insert

<400> SEQUENCE: 17

Glu Leu Cys Asp Gly Phe Ala
1               5

<210> SEQ ID NO 18
<211> LENGTH: 7
<212> TYPE: PRT
<213> ORGANISM: Artificial Sequence
<220> FEATURE:
<223> OTHER INFORMATION: heptamer insert

<400> SEQUENCE: 18

His His Asn Asp Arg Ala Pro
1               5

<210> SEQ ID NO 19
<211> LENGTH: 7
<212> TYPE: PRT
<213> ORGANISM: Artificial Sequence
<220> FEATURE:
<223> OTHER INFORMATION: heptamer insert

<400> SEQUENCE: 19

Asp Gly Asn Leu His Lys Ser
1               5

<210> SEQ ID NO 20
<211> LENGTH: 7
<212> TYPE: PRT
<213> ORGANISM: Artificial Sequence
<220> FEATURE:
<223> OTHER INFORMATION: heptamer insert

<400> SEQUENCE: 20

His Ser Asp Ser Ser Lys Pro
1               5

<210> SEQ ID NO 21
<211> LENGTH: 7
<212> TYPE: PRT
<213> ORGANISM: Artificial Sequence
<220> FEATURE:
```

<223> OTHER INFORMATION: heptamer insert

<400> SEQUENCE: 21

Thr Leu Thr Gly Leu Cys Pro
1               5

<210> SEQ ID NO 22
<211> LENGTH: 7
<212> TYPE: PRT
<213> ORGANISM: Artificial Sequence
<220> FEATURE:
<223> OTHER INFORMATION: heptamer insert

<400> SEQUENCE: 22

Asn His Ala Pro Asn His Cys
1               5

<210> SEQ ID NO 23
<211> LENGTH: 7
<212> TYPE: PRT
<213> ORGANISM: Artificial Sequence
<220> FEATURE:
<223> OTHER INFORMATION: heptamer insert

<400> SEQUENCE: 23

Asp Arg Arg Pro Gly Ile Cys
1               5

<210> SEQ ID NO 24
<211> LENGTH: 7
<212> TYPE: PRT
<213> ORGANISM: Artificial Sequence
<220> FEATURE:
<223> OTHER INFORMATION: heptamer insert

<400> SEQUENCE: 24

Val Asp Ala Thr Cys Met Gln
1               5

<210> SEQ ID NO 25
<211> LENGTH: 54
<212> TYPE: DNA
<213> ORGANISM: Artificial Sequence
<220> FEATURE:
<223> OTHER INFORMATION: single-stranded randomized 7mer pool with NNB
      codons
<220> FEATURE:
<221> NAME/KEY: misc_feature
<222> LOCATION: (14)..(15)
<223> OTHER INFORMATION: n is a, c, g, or t
<220> FEATURE:
<221> NAME/KEY: misc_feature
<222> LOCATION: (17)..(18)
<223> OTHER INFORMATION: n is a, c, g, or t
<220> FEATURE:
<221> NAME/KEY: misc_feature
<222> LOCATION: (20)..(21)
<223> OTHER INFORMATION: n is a, c, g, or t
<220> FEATURE:
<221> NAME/KEY: misc_feature
<222> LOCATION: (23)..(24)
<223> OTHER INFORMATION: n is a, c, g, or t
<220> FEATURE:
<221> NAME/KEY: misc_feature
<222> LOCATION: (26)..(27)
<223> OTHER INFORMATION: n is a, c, g, or t
<220> FEATURE:
<221> NAME/KEY: misc_feature
<222> LOCATION: (29)..(30)
<223> OTHER INFORMATION: n is a, c, g, or t
<220> FEATURE:

<221> NAME/KEY: misc_feature
<222> LOCATION: (32)..(33)
<223> OTHER INFORMATION: n is a, c, g, or t

<400> SEQUENCE: 25
ttggcgcgcc gcvnnvnnvn nvnnvnnvnn vnnggcggcc gcttttttcc ttga        54

<210> SEQ ID NO 26
<211> LENGTH: 15
<212> TYPE: DNA
<213> ORGANISM: Artificial Sequence
<220> FEATURE:
<223> OTHER INFORMATION: antisense primer

<400> SEQUENCE: 26
ctcaaggaaa aaagc        15

<210> SEQ ID NO 27
<211> LENGTH: 2208
<212> TYPE: DNA
<213> ORGANISM: adeno-associated virus 2

<400> SEQUENCE: 27

```
atggctgccg atggttatct tccagattgg ctcgaggaca ctctctctga aggaataaga         60
cagtggtgga agctcaaacc tggcccacca ccaccaaagc ccgcagagcg cataaggac        120
gacagcaggg tcttgtgct tcctgggtac aagtacctcg acccttcaa cggactcgac         180
aagggagagc cggtcaacga ggcagacgcc gcggccctcg agcacgacaa agcctacgac        240
cggcagctcg acagcggaga caacccgtac ctcaagtaca accacgccga cgcggagttt        300
caggagcgcc ttaaagaaga tacgtctttt ggggcaacc tcggacgagc agtcttccag        360
gcgaaaaaga gggttcttga acctctgggc ctggttgagg aacctgttaa gacggctccg        420
ggaaaaaaga ggccggtaga gcactctcct gtggagccag actcctcctc gggaaccgga        480
aaggcgggcc agcagcctgc aagaaaaaga ttgaattttg gtcagactgg agacgcagac        540
tcagtacctg accccagcc tctcggacag ccaccagcag cccctctgg tctgggaact        600
aatacgatgg ctacaggcag tggcgcacca atggcagaca taacgaggg cgccgacgga        660
gtgggtaatt cctccggaaa ttggcattgc gattccacat ggatgggcga cagagtcatc        720
accaccagca cccgaacctg ggccctgccc accttcaaca accacctgta caaacaaatt        780
tccagccaat caggagcttc gaacgacaat cacttctttg gctacagcac cccttggggg        840
tattttgact tcaacagatt ccactgccac ttttcaccac gtgactggca agactcatc        900
aacaacaact ggggattccg acccaagaga ctcaacttca agctctttaa cattcaagtc        960
aaagaggtca cgcagaatga cggtacgacg acgattgcca ataaccttac cagcacggtt       1020
caggtgttta ctgactcgga gtaccagctc ccgtacgtcc tcggctcggc gcatcaagga       1080
tgcctcccgc cgttcccagc agacgtcttc atggtgccac agtatggata cctcaccctg       1140
aacaacggga gtcaggcagt aggacgctct tcatttact gcctggagta ctttccttct       1200
cagatgctgc gtaccggaaa caactttacc ttcagctaca cttttgagga cgttcctttc       1260
cacagcagct acgctcacag ccagagtctg accgtctca tgaatcctct catcgaccag       1320
tacctgtatt tcttaagcag aacaaacact ccaagtggaa ccaccacgca gtcaaggctt       1380
cagttttctc aggccggagc gagtgacatt cgggaccagt ctaggaactg gcttcctgga       1440
ccctgttacc gccagcagcg agtatcaaag acatctgcgg ataacaacaa cagtgaattc       1500
tcgtggaccg gtgctaccaa gtaccacctc aatggcagag actctctggt gaatccgggc       1560
```

```
ccggccatgg caagccacaa ggacgatgaa gaaaagtttt ttcctcagag cggggttctc   1620
atctttggga agcaaggctc agagaaaaca aatgtggaca ttgaaaaggt catgattaca   1680
gacgaagagg aaatcaggac aaccaatccc gtggctacgg agcagtatgg ttctgtatct   1740
accaacctcc agagaggcaa cagacaagca gctaccgcag atgtcaacac acaaggcgtt   1800
cttccaggca tggtctggca ggacagagat gtgtaccttc aggggcccat ctgggcaaag   1860
attccacaca cggacggaca ttttcacccc tctcccctca tgggtggatt cggacttaaa   1920
caccctcctc cacagattct catcaagaac accccggtac ctgcgaatcc ttcgaccacc   1980
ttcagtgcgg caaagtttgc ttccttcatc acacagtact ccacgggaca ggtcagcgtg   2040
gagatcgagt gggagctgca gaaggaaaac agcaaacgct ggaatcccga aattcagttc   2100
acttcgaact acaacaagtc tgttaatgtg gactttactg tggacactaa tggcgtgtat   2160
tcagagcctc gccccattgg taccagattc ctgactcgta atctgtaa               2208
```

```
<210> SEQ ID NO 28
<211> LENGTH: 12
<212> TYPE: PRT
<213> ORGANISM: Artificial Sequence
<220> FEATURE:
<223> OTHER INFORMATION: alanin spacer

<400> SEQUENCE: 28

Ala Ala Ala Ser Ala Ser Glu Ala Ser Thr Ala Ala
1               5                   10
```